(12) United States Patent
Asterjadhi et al.

(10) Patent No.: US 12,414,189 B2
(45) Date of Patent: *Sep. 9, 2025

(54) SIGNALING FOR MULTI-LINK COMMUNICATION IN A WIRELESS LOCAL AREA NETWORK (WLAN)

(71) Applicant: QUALCOMM Incorporated, San Diego, CA (US)

(72) Inventors: Alfred Asterjadhi, San Diego, CA (US); Abhishek Pramod Patil, San Diego, CA (US); George Cherian, San Diego, CA (US); Sai Yiu Duncan Ho, San Diego, CA (US); Lochan Verma, Danville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,579

(22) Filed: May 30, 2024

(65) Prior Publication Data

US 2024/0407036 A1 Dec. 5, 2024

Related U.S. Application Data

(63) Continuation of application No. 18/049,123, filed on Oct. 24, 2022, now Pat. No. 12,028,923, which is a
(Continued)

(51) Int. Cl.
*H04W 76/20* (2018.01)
*H04B 7/0413* (2017.01)
(Continued)

(52) U.S. Cl.
CPC .......... *H04W 76/20* (2018.02); *H04B 7/0413* (2013.01); *H04W 52/0235* (2013.01); *H04W 76/15* (2018.02)

(58) Field of Classification Search
CPC . H04W 76/20; H04W 52/0235; H04W 76/15; H04W 52/0216; H04W 76/34; H04B 7/0413; H04B 7/26; H04L 45/245
See application file for complete search history.

(56) References Cited

U.S. PATENT DOCUMENTS 8,611,257 B1  12/2013  Nachum et al.
10,292,144 B2 *  5/2019  Kim .................... H04B 7/26
(Continued)

FOREIGN PATENT DOCUMENTS

CN  108370593 A  8/2018
CN  109587052 A *  4/2019  ............ H04L 45/24
(Continued)

OTHER PUBLICATIONS

Huang P-K., et al., "Extremely Efficient Multi-Band Operation," IEEE, May 12, 2019, XP002800556, 30 Pages, Slides 2.5.9.11.
(Continued)

*Primary Examiner* — Ayaz R Sheikh
*Assistant Examiner* — Louis Samara
(74) *Attorney, Agent, or Firm* — Holland & Hart LLP/Qualcomm

(57) ABSTRACT

This disclosure provides systems, methods, and apparatus, including computer programs encoded on computer-readable media, for signaling between an access point (AP) multi-link device (MLD) and a non-AP MLD that support multi-link communication in a wireless local area network (WLAN). In some implementations, a multi-link association may include a first link (referred to as an anchor link) and one or more other links (referred to as auxiliary links). The signaling may include control information to activate or deactivate auxiliary links dynamically based on communication load, throughput requirements, or quality of service (QOS). The signaling also may include requests, acknowl-
(Continued)

edgments, or negotiation regarding multi-link connections. Furthermore, signaling and timing information may be used to coordinate when auxiliary links are used for communication or when to promote an auxiliary link to an anchor link.

32 Claims, 23 Drawing Sheets

Related U.S. Application Data continuation of application No. 16/915,983, filed on Jun. 29, 2020, now Pat. No. 11,510,269.

(60) Provisional application No. 62/869,546, filed on Jul. 1, 2019.

(51) Int. Cl.
*H04W 52/02* (2009.01)
*H04W 76/15* (2018.01)

(56) References Cited

U.S. PATENT DOCUMENTS

| | | |
|---|---|---|
| 11,510,269 B2 | 11/2022 | Asterjadhi et al. |
| 12,028,923 B2 | 7/2024 | Asterjadhi et al. |
| 2006/0274666 A1* | 12/2006 | Kim .................... G08G 1/0969 370/252 |
| 2013/0051261 A1 | 2/2013 | Kazmi et al. |
| 2014/0177501 A1 | 6/2014 | Seok et al. |
| 2014/0269461 A1 | 9/2014 | Mehta |
| 2015/0289299 A1 | 10/2015 | Abraham et al. |
| 2017/0006526 A1 | 1/2017 | Seok |
| 2017/0265130 A1 | 9/2017 | Kakani |
| 2017/0318325 A1* | 11/2017 | Ortiz .................... H04N 21/436 |
| 2018/0183723 A1 | 6/2018 | Cariou et al. |
| 2018/0206143 A1* | 7/2018 | Patil ...................... H04L 45/245 |
| 2018/0206174 A1 | 7/2018 | Zhou et al. |
| 2018/0206190 A1 | 7/2018 | Cherian et al. |
| 2019/0028967 A1 | 1/2019 | Ahn et al. |
| 2019/0150214 A1* | 5/2019 | Zhou .................... H04W 76/15 370/329 |
| 2019/0158385 A1* | 5/2019 | Patil ...................... H04W 76/15 |
| 2019/0158413 A1* | 5/2019 | Patil .................. H04W 28/0838 |
| 2019/0253194 A1 | 8/2019 | Jiang et al. |
| 2019/0297571 A1* | 9/2019 | Jose ................. H04W 52/0216 |
| 2020/0137626 A1 | 4/2020 | Huang et al. |
| 2020/0163141 A1 | 5/2020 | Hsu et al. |
| 2020/0383156 A1 | 12/2020 | Seok et al. |
| 2020/0412513 A1 | 12/2020 | Bergstrom et al. |
| 2020/0413291 A1 | 12/2020 | Chu et al. |
| 2021/0227502 A1 | 7/2021 | Huang et al. |
| 2021/0282229 A1 | 9/2021 | Stacey et al. |
| 2021/0400662 A1 | 12/2021 | Huang et al. |
| 2023/0146138 A1 | 5/2023 | Asterjadhi et al. |

FOREIGN PATENT DOCUMENTS

| | | | |
|---|---|---|---|
| EP | 2360866 A1 | 8/2011 | |
| EP | 3099092 B1 * | 1/2020 | ........... H04L 67/303 |
| JP | 6728359 B2 * | 7/2020 | ........... H04L 5/0094 |
| WO | 2015153763 | 10/2015 | |
| WO | 2018226017 A1 | 12/2018 | |

OTHER PUBLICATIONS

International Search Report and Written Opinion—PCT/US2020/040340—ISA/EPO—Oct. 15, 2020.
Khorov E., et al., "Current Status and Directions of IEEE 802.11be, the Future Wi-Fi 7", IEEE Access, vol. 4, 2016, pp. 1-26.
Park M., et al., "Enhanced Multi-Link Single Radio Operation", Jun. 4, 2020, Doc: 802.11-20/0562r4, pp. 1-22.

* cited by examiner

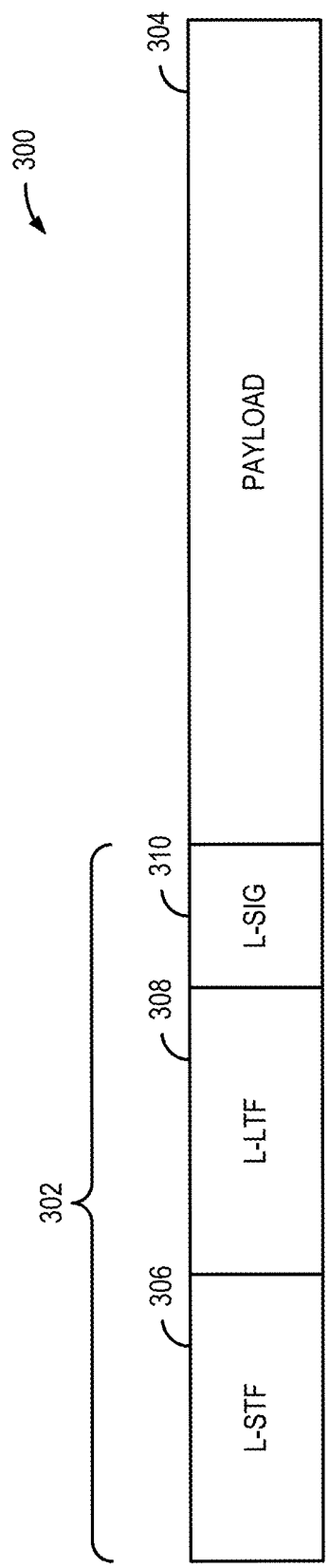
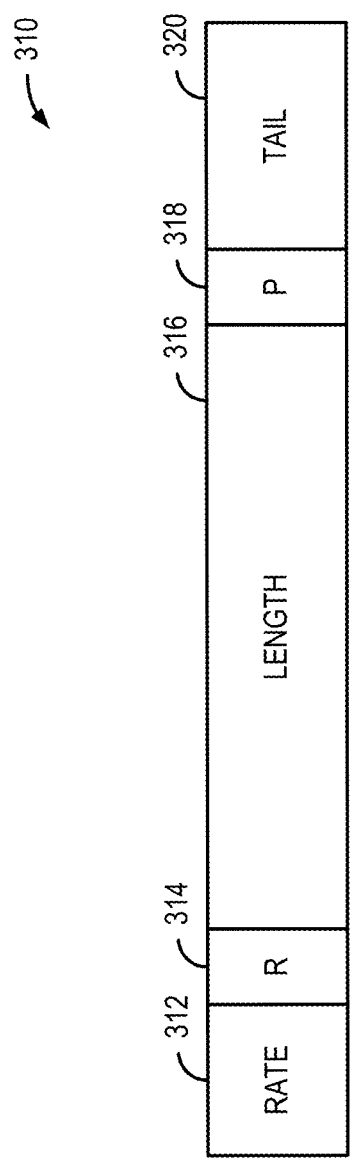
FIGURE 3A
FIGURE 3B

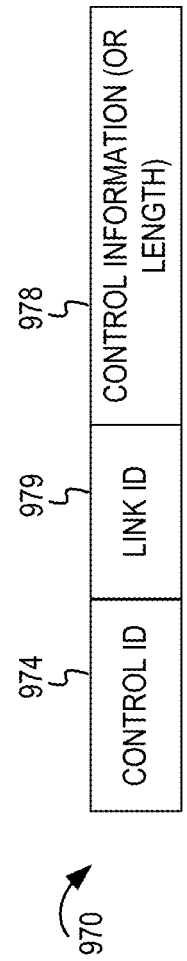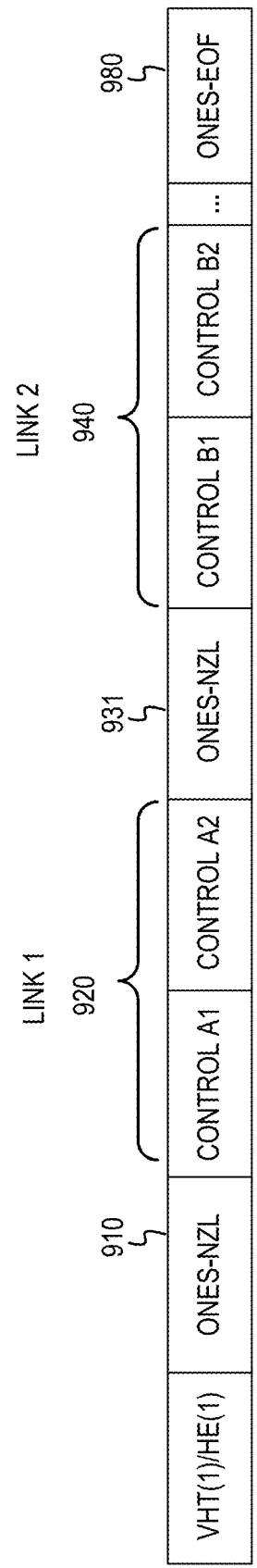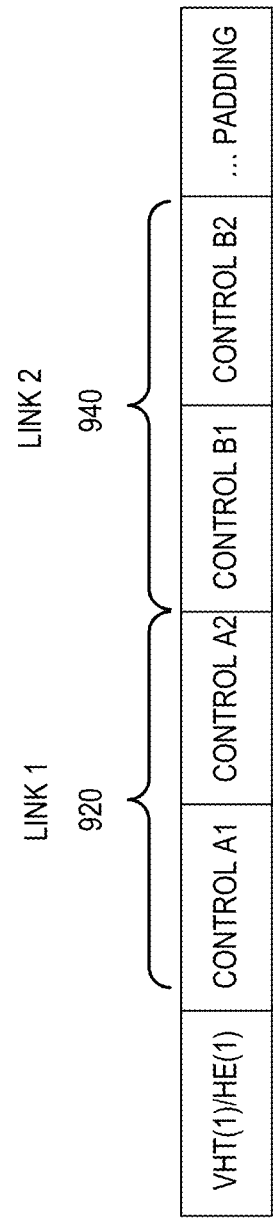
*FIGURE 9C*
*FIGURE 9D*
*FIGURE 9E*

SIGNALING FOR MULTI-LINK COMMUNICATION IN A WIRELESS LOCAL AREA NETWORK (WLAN)

PRIORITY

The present application for Patent is a Continuation of U.S. patent application Ser. No. 18/049,123 filed Oct. 24, 2022, entitled "SIGNALING FOR MULTI-LINK COMMUNICATION IN A WIRELESS LOCAL AREA NETWORK (WLAN)", which is a Continuation of U.S. patent application Ser. No. 16/915,983 (now US Granted U.S. Pat. No. 11,510,269) filed Jun. 29, 2020, entitled "SIGNALING FOR MULTI-LINK COMMUNICATION IN A WIRELESS LOCAL AREA NETWORK (WLAN)", which claims priority to U.S. Provisional Patent Application No. 62/869,546 filed Jul. 1, 2019, entitled "SIGNALING FOR MULTI-LINK COMMUNICATION IN A WIRELESS LOCAL AREA NETWORK (WLAN)," each of which are assigned to the assignee hereof and each of which are expressly incorporated by reference herein.

TECHNICAL FIELD

This disclosure relates generally to the field of wireless communication, and more specifically, to multi-link communication in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames so that a STA within wireless range of the AP can establish an association with the WLAN.

A STA may have a wireless connection (referred to as a wireless association, or just "association") when it has authenticated and established a wireless session with the AP. Devices in a WLAN may share control information to maintain or share status. Recently, the IEEE is considering new features and new connectivity protocols to improve service speed and throughput. There is an opportunity to add or improve aspects of a WLAN as the communication protocols evolve.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a multi-link device (MLD) for wireless communication. The method may include establishing a multi-link association between an access point (AP) MLD and a non-AP MLD. The multi-link association may include a first link between a first station (STA) interface of the non-AP MLD and a first basic service set (BSS) of the AP MLD and further include a second link between a second STA interface of the non-AP MLD and a second BSS of the AP MLD. The method may include sending or receiving signaling, via the first link, to activate or deactivate the second link.

In some implementations, the first link is an anchor link of the multi-link association and the second link is an auxiliary link of the multi-link association.

In some implementations, the signaling includes an indication to activate or deactivate the second link, the indication included in an aggregated control (A-Control) field of a first frame sent or received via the first link.

In some implementations, the A-Control field has a specified format that includes a field for the indication to activate or deactivate the second link.

In some implementations, the specified format of the A-Control field is consistent for each of a plurality of frames.

In some implementations, the first frame is a frame format selected from a group consisting of a management frame, a control frame, and a data frame.

In some implementations, the first frame is selected from a group consisting of a request to send (RTS), a clear to send (CTS), and an acknowledgement.

In some implementations, the first frame is a power saving poll (PS-POLL) frame, a quality-of service (QOS) Null frame, or a null data packet (NDP).

In some implementations, the first frame is first media access control (MAC) protocol data unit (MPDU).

In some implementations, the first MPDU is included in an aggregated MPDU (A-MPDU) transmission.

In some implementations, the first MPDU includes data in a payload portion and the indication to activate the second link in a header portion.

In some implementations, a plurality of control parameters included in the first frame. The plurality of control parameters may include a first subset of control parameters related to the first link and a second subset of control parameters related to the second link.

In some implementations, the first frame further includes a configuration for the second link.

In some implementations, establishing the multi-link association includes communicating a configuration of the second link. The configuration may indicate one or more parameters selected from a group consisting of bandwidth, wireless channel, transmission rate, and frequency band.

In some implementations, the indication is included in a multi-link control field.

In some implementations, the indication includes timing information related when to activate or deactivate the second link.

In some implementations, the timing information includes a time offset relative to a start or end of the first frame.

In some implementations, the timing information includes a time value based on a timer synchronized at the AP MLD and the non-AP MLD.

In some implementations, the timer is synchronized for the first link, the second link, or both the first and second links.

In some implementations, the method may include determining a target wake time (TWT) service period (SP) for the second link and activating the second link during the TWT SP.

In some implementations, establishing the multi-link association includes communicating multi-link capability parameters between the AP MLD and the non-AP MLD.

In some implementations, the multi-link capability parameters include at least a first value indicating a warm up time associated with a radio to activate the second link by the non-AP MLD.

In some implementations, the method may include determining a delay or initial data padding for a communication on the second link for use immediately after activating the second link and before communicating data via the second link.

In some implementations, the multi-link capability parameters include a dynamic link activation time associated with adding a new auxiliary link to the multi-link association.

In some implementations, the AP MLD includes non-colocated APs.

In some implementations, the first link is in a first band and the second link is in a second band.

In some implementations, the first link is in a first channel of a first band and the second link is in a second channel of the first band.

In some implementations, the first link includes a first set of spatial streams and the second link includes a second set of spatial streams.

In some implementations, the method includes signaling, via the first link, a target beacon transmission time (TBTT) of the second link.

In some implementations, the non-AP MLD is a single radio client that is capable of using a multi-link association by switching a single radio of the non-AP MLD from the first link to the second link when the second link is activated.

In some implementations, the indication to activate the second link is transmitted via a non-multiple-input-multiple-output (non-MIMO) communication via the first link. The method may include deactivating the second link or the first link during a MIMO communication via the other one of the second link or the first link.

In some implementations, the method includes designating one of the first link or the second link as an anchor link of the multi-link association regardless of which link was used to establish the multi-link association.

In some implementations, the method includes changing a designation of the anchor link to another one of the first link or the second link, wherein the anchor link is a link that is maintained for signaling regarding the multi-link association and other links are designated as auxiliary links that can be dynamically activated using signaling via the anchor link.

Another innovative aspect of the subject matter described in this disclosure can be implemented as a method for wireless communication by a non-AP multi-link device (MLD). The method may include establishing a multi-link association with an access point (AP) MLD. The multi-link association may include a first link between a first station (STA) interface of the non-AP MLD and a first basic service set (BSS) of the AP MLD and may further include a second link between a second STA interface of the non-AP MLD and a second BSS of the AP MLD. The method may include determining that the second link can be deactivated based, at least in part, on an amount of traffic for the second link being below a threshold amount. The method may include deactivating the second link by causing the second STA interface to enter a doze state.

In some implementations, the method may include receiving signaling, via the first link, to activate the second link. The method may include activating the second link by causing the second STA interface to enter an awake state.

In some implementations, the signaling to activate the second link includes a traffic indication from the AP MLD that indicates buffered downlink traffic for the second link.

In some implementations, activating the second link includes deactivating the first link by causing the first STA interface to enter a doze state, switching one or more antennas from a first connection to the first STA interface to a second connection to the second STA interface, and causing the second STA interface to enter the awake state for multi-input-multiple-output (MIMO) communication using multiple antennas including the one or more antennas.

In some implementations, the first link is designated as an anchor link and the second link is designated as an auxiliary link during the multi-link association.

In some implementations, the method may include, after the multi-link association, changing the designation of the anchor link from the first link to the second link. The method may include deactivating the first link by causing the first STA to enter a doze state.

In some implementations, changing the designation includes implicitly designating the second link as the anchor link by activating the second link and deactivating the first link.

In some implementations, changing the designation includes explicitly designating the second link as the anchor link by sending signaling to the AP MLD.

In some implementations, the method may include receiving signaling, from the AP MLD, that indicates buffered downlink traffic for the non-AP MLD. The method may include determining one or more links of the multi-link association to activate for communication with the AP MLD based, at least in part, on an amount of the buffered downlink traffic.

Another innovative aspect of the subject matter described in this disclosure can be implemented as a computer-readable medium having stored therein instructions which, when executed by a processor, causes the processor to perform any one of the above methods.

Another innovative aspect of the subject matter described in this disclosure can be implemented as an apparatus having an interface for communicating via a wireless local area network and a processor. The processor may be configured to perform any one of the above methods.

Another innovative aspect of the subject matter described in this disclosure can be implemented as system including means for implementing any one of the above methods.

Another innovative aspect of the subject matter described in this disclosure can be implemented as an apparatus having a first STA interface configured to establish a first link between the first STA interface and a first BSS of an AP MLD as part of a multi-link association. The apparatus may have a second STA interface configured to establish a second link between the second STA interface and a second BSS of the AP MLD as part of the multi-link association. The apparatus may have a processor configured to output or obtain signaling, via the first STA interface, the signaling including an indication to activate or deactivate the second link.

In some implementations, the first link is an anchor link of the multi-link association and the second link is an auxiliary link of the multi-link association.

In some implementations, the indication to activate or deactivate the second link is included in an aggregated control (A-Control) field of a first frame sent or received via the first link.

In some implementations, the A-Control field has a specified format that includes a field for the indication to activate or deactivate the second link.

In some implementations, the specified format of the A-Control field is consistent for each of a plurality of frames.

In some implementations, the first frame is a frame format selected from a group consisting of a management frame, a control frame, and a data frame.

In some implementations, the first frame is selected from a group consisting of a request to send (RTS), a clear to send (CTS), and an acknowledgement.

In some implementations, the first frame is a power saving poll (PS-POLL) frame, a quality-of service (QOS) Null frame, or a null data packet (NDP).

In some implementations, the first frame is first media access control (MAC) protocol data unit (MPDU).

In some implementations, the first MPDU is included in an aggregated MPDU (A-MPDU) transmission.

In some implementations, the first MPDU includes data in a payload portion and the indication to activate the second link in a header portion.

In some implementations, the indication is included in a multi-link control field.

In some implementations, the indication includes timing information related when to activate or deactivate the second link.

In some implementations, the processor may be configured to determine a target wake time (TWT) service period (SP) for the second link and activate the second link during the TWT SP.

In some implementations, the processor is further configured to communicate multi-link capability parameters to the AP MLD via the first STA interface or the second STA interface as part of the multi-link association.

Another innovative aspect of the subject matter described in this disclosure can be implemented as a wireless communication device. The wireless communication device may include a plurality of STA interfaces, at least one processor, and at least one memory communicatively coupled with the at least one processor and storing processor-readable code that, when executed by the at least one processor, causes the wireless communication device to perform any of the above-mentioned methods. For example, the processor-readable code that, when executed by the at least one processor, may cause the wireless communication device to establish a multi-link association with an AP MLD. The multi-link association may include a first link between a first STA interface of the plurality of STA interfaces and a first BSS of the AP MLD and may further include a second link between a second STA interface of the plurality of STA interfaces and a second BSS of the AP MLD. The processor-readable code that, when executed by the at least one processor, causes the wireless communication device to send or receive signaling, via the first link, to activate or deactivate the second link.

Another innovative aspect of the subject matter described in this disclosure can be implemented as a mobile device. The mobile device may include a wireless communication device having a plurality of STA interfaces, at least one processor, and at least one memory communicatively coupled with the at least one processor and storing processor-readable code that, when executed by the at least one processor, causes the wireless communication device to perform any of the above-mentioned methods. For example, the processor-readable code that, when executed by the at least one processor, may cause the wireless communication device to establish a multi-link association with an AP MLD. The multi-link association may include a first link between a first STA interface of the plurality of STA interfaces and a first BSS of the AP MLD and may further include a second link between a second STA interface of the plurality of STA interfaces and a second BSS of the AP MLD. The processor-readable code that, when executed by the at least one processor, causes the wireless communication device to send or receive signaling, via the first link, to activate or deactivate the second link. The mobile device may include at least one transceiver coupled to the wireless communication device, at least one antenna coupled to the at least one transceiver to wirelessly transmit signals output from the at least one transceiver and to wirelessly receive signals for input into the at least one transceiver and a housing that encompasses the wireless communication device, the at least one transceiver and at least a portion of the at least one antenna.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 3A shows an example protocol data unit (PDU) usable for communications between an access point (AP) and a station (STA).

FIG. 3B shows an example field in the PDU of FIG. 3A.

FIG. 9C shows an example of explicit indicators for multi-link aggregated control parameters.

FIG. 9D shows another example of an A-Control field with control parameters for one or more links of a multi-link association.

FIG. 9E shows an example of an A-Control field with control parameters for multiple links without using delimiters.

Like reference numbers and designations in the various drawings indicate like elements.

DETAILED DESCRIPTION

Figure 1:
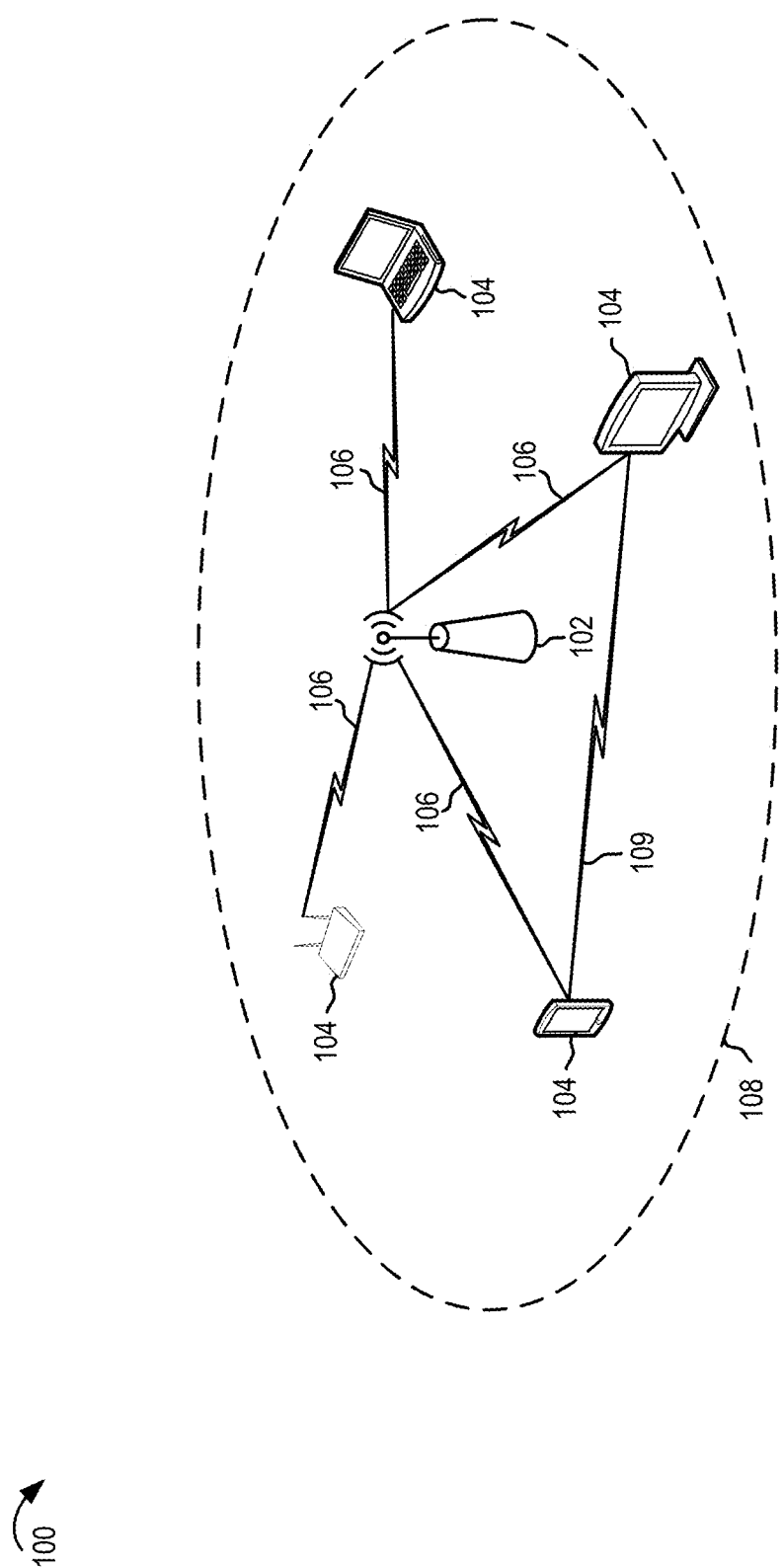
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input-multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

A wireless local area network (WLAN) in a home, apartment, business, or other areas may include one or more WLAN devices that share a wireless communication medium. A station (STA) is a logical entity in a WLAN device and represents an addressable instance of a media access control (MAC) and physical layer (PHY) interface to the wireless communication medium. An access point (AP) is a WLAN device that includes a STA interface as well as a distribution system access function. Often the shorthand terms "AP" and "STA" may been used to distinguish between those WLAN devices that include the distribution system access function and those that do not, respectively. The basic building block of a WLAN conforming to the Institute of Electrical and Electronics Engineers (IEEE) 802.11 family of standards is a Basic Service Set (BSS), which is managed by an AP. Each BSS includes the AP and those STAs that are associated with the AP.

Some WLAN devices may operate multiple STA interfaces, such as a first STA interface and a second STA interface in the same device. Recently, the IEEE is discussing techniques for multi-link association. A multi-link device (MLD) is a type of WLAN device that includes multiple interfaces and is capable of establishing a multi-link association with another MLD. An AP MLD may operate multiple BSSs and supports a multi-link association with a non-AP MLD. Other terms may be envisioned for the various types of MLDs. For example, an AP MLD also may be referred to as an AP entity or a multi-link access point (ML-AP). A non-AP MLD also may be referred to as non-AP entity, a STA MLD, or a multi-link station (ML-STA). For clarity, this disclosure refers to the multi-link capable devices as either an AP MLD or a non-AP MLD. In some implementations, an AP MLD may operate a first BSS in a first frequency band and a second BSS in a second frequency band. The AP MLD and a non-AP MLD may establish a multi-link association in which multiple links are enabled between the AP MLD and the non-AP MLD. Each link of the multi-link association may be between a different STA interface of a non-AP-MLD in a corresponding BSS of the AP MLD. For example, a non-AP MLD may establish a first link to the first BSS using a first STA interface of the non-AP MLD and may establish a second link to the second BSS using a second STA interface of the non-AP MLD. The multiple links of the multi-link association may be established using different channels, frequency bands, or spatial streams, among other examples.

A multi-link association may streamline the establishment of multiple links. A multi-link association also may be referred to as a multi-link setup. The AP MLD and the non-AP MLD may exchange the setup and response frames via a first link to provision or configure multiple links of the multi-link association. The multi-link setup via the first link may enable the multiple STAs of the non-AP MLD to concurrently associate with the different BSSs operated by the AP MLD. Thereafter, one link (which may be the first link or any of the other links established in the multi-link setup) may be maintained as an active connection for signaling or other basic BSS operations related to the multi-link association. In some implementations, the link that is maintained for signaling or other basic BSS operations may be referred to as an anchor link, main link, primary link, master link, control link, or other terms to differentiate that link from other links of the multi-link association. From time to time, the AP MLD and non-AP MLD may change which link is currently the anchor link for the multi-link association. The other links of the multi-link association may be referred to as auxiliary links, non-anchor links, secondary links, subordinate links, dynamic links, or other such terms. For clarity, the terms "anchor link" and "auxiliary link" are used in this disclosure.

Multi-link communication may enable a larger amount of data throughput between the MLDs because multiple links may concurrently transmit data when they are activated. Each link may be associated with a different radio frequency (RF) chain of the MLD and each RF chain may consume power when it is activated for multi-link communication. Therefore, when less data is available it may desirable to deactivate some auxiliary links to reduce power consumption. Having the ability to dynamically activate or deactivate auxiliary links may provide greater flexibility for power saving and throughput.

This disclosure provides systems, methods, and apparatus, including computer programs encoded on computer-readable media, for multi-link communication. Various aspects relate generally to signaling to manage the activation or deactivation of auxiliary links of a multi-link association. The signaling may enable that AP MLD and the non-AP MLD to select which links to activate for communication of traffic between them. For example, the activation or deactivation of an auxiliary link may be signaled by explicit messaging, broadcast messaging, or as part of a data packet on the anchor link. The activation of an auxiliary link may be based on an amount or type of data buffered to send from an AP MLD to a non-AP MLD, or vice versa. An AP MLD may set up an anchor link to aid the non-AP MLD with power saving capability, throughput, reliability, or data separation. For example, In accordance with this disclosure, signaling regarding multi-link associations may be sent or received on the anchor link. In some implementations, an AP MLD may indicate that it supports a multi-link association in the beacon frames or other discovery information that the AP MLD broadcasts so that the non-AP MLD can determine that the AP MLD supports multi-link association. When the AP MLD and the non-AP MLD establishes a multi-link association, a traffic identifier (TID) may be mapped to one or more links established by the multi-link association. In some implementations, each link in the multi-link association may be identified by a link identifier (Link ID) or other indicator to distinguish the links.

An auxiliary link may be "enabled" for communication when a TID is mapped to it. However, even though the auxiliary link is enabled, the non-AP MLD or the AP MLD may dynamically activate or deactivate the auxiliary link based on the availability of traffic associated with the TID. Furthermore, one or more auxiliary links may be dynamically activated or deactivated based on throughput requirements, speed, or quality of service. When the auxiliary link is activated, the STA interface for that link may be in an awake state such that it is fully powered and able to transmit or receive data. When the auxiliary link is deactivated, the STA interface for that link may be in a doze state in which the STA interface consumes very low power and is unable to transmit or receive data. In some implementations, activation of an auxiliary link also may include enabling the auxiliary link by mapping a TID to that link. Furthermore, an auxiliary link may be disabled and deactivated when there is no TID mapped to that link.

Some aspects more specifically relate to power saving techniques that involve activation or deactivation of auxiliary links. The signaling described in this disclosure may be used to realize power savings in a non-AP MLD. For example, a non-AP MLD may reduce the quantity of RF chains that would otherwise be activated and idle. In some implementations, the MLDs may utilize signaling on the anchor link to communicate status or information that would otherwise be signaled separately on the auxiliary links. In some implementations, the signaling may include timing information to coordinate the timing of communication via an auxiliary link or the timing for activation of the auxiliary link. In some implementations, an AP MLD may provide sufficient time for a non-AP MLD to energize an RF chain for an auxiliary link as part of the activation before transmitting data on the auxiliary link. Referred to as a "warm up" time, there may be a delay associated with preparing a second RF chain at the non-AP MLD. Signaling may ensure that sufficient warm up time is provided so that the non-AP MLD is ready to receive communication before the AP MLD sends communication on the auxiliary link.

In some implementations, an anchor link may be set up on a lower frequency band for better coverage and reliability while an auxiliary link may be set up on a higher frequency band so that the auxiliary link can be activated for greater throughput when there is data to send. In some implementations, the auxiliary link may be used as an on-demand dedicated data channel. And because signaling or management frames may be communicated via the anchor link there may be a greater efficiency of communication on the dedicated data channel. In some implementations, the link that is designated as the anchor link can be changed dynamically based on the link on which the non-AP MLD indicates it is awake or present. In some implementations, an AP MLD may signal the availability of traffic to send to the non-AP MLD. The non-AP MLD may indicate which link or links (among those mapped to a TID for that traffic) to activate for the transmission of the traffic.

In legacy technical standards, control information may be structured according to a fixed length field and defined bit locations for different control parameters. More recently, the quantity and type of control parameters has increased, making legacy control formats insufficient. Furthermore, the fixed length of legacy control formats limits the type and quantity of control parameters that can be included in a frame. To provide some greater flexibility, an aggregated control (A-Control) field may include multiple control parameters. Each control parameter (sometimes also referred to as a control field or a control subfield) may include a control identifier (Control ID) and a control value. In some implementations, a device may operate simultaneously or at different times with multiple links (multi-link, multi-channel, or multi-bands). The A-Control field may be structured to include multi-link control information. For example, the A-Control field may include a first subset of control parameters for an anchor link and a second subset of control parameters for an auxiliary link. For example, the A-Control field may include signaling for indicating control information that governs or helps the functionality of a link. As an example, the signaling may include signaling for dynamic activation or deactivation of various auxiliary links.

This disclosure includes a variety of techniques for signaling multi-link control information. For example, each of the links may be identified using explicit signaling or implicitly based on one or more of the structure of the A-Control field, certain bit settings in frames that carry the A-Control field, or the link (such as the channel or band) at which the frame is exchanged. Therefore, the identifier of the link of interest may be determined from the A-Control field or the frame that carries the A-Control field. For example, a link may be identified by certain bits preceding each set of Control parameters. In another example, the link may be identified by certain bits contained in the frame that carries the A-Control field. In some implementations, the A-Control field may contain a link identifier or delimiter to signal the beginning or end of a subset of control parameters for each link. In some implementations, the MPDU may be a Management frame containing an information element (IE) identifying the link of interest. In some implementations, the link identifier may be contained in the QoS Control field, or any other field of the MAC header that precedes the field containing the A-Control field. The A-Control field described in this disclosure may be included in any type of frame, including a management frame, a data frame or a control frame. The A-Control field also may be included in a PPDU that does not contain a Data field. For example, the A-Control field may be included as a field of the PHY header of the PPDU without having a data field. In some implementations, the A-Control field may be included in an MPDU that is part of an A-MPDU with multiple frames. In some implementations, the A-Control field may be included in a payload of a null frame (such as a quality-of-service, QoS, Null frame or a null data packet (NDP)).

In some implementations, the AP MLD or the non-AP MLD may wake up or activate an auxiliary link that was previously deactivated using signaling described herein. Furthermore, the activation of an auxiliary link also may include activation of spatial multiplexing (SM) on the auxiliary link. SM power saving may be implemented for one or more links of a multi-link association. SM power saving refers to the use of single-stream communication for basic signaling and lower power consumption. At times when more data is communicated, additional RF chains may be activated to perform processing of different SM streams. In a multi-link association, the SM power saving may be used on an anchor link. When there is data to transmit or receive, an MLD may activate additional RF chains (for either or both the anchor link or auxiliary links) to take advantage of spatial multiplexing. When there is no data (or little data) to transmit or receive, the MLD may deactivate RF chains to conserve power.

Particular implementations of the subject matter described in this disclosure can be implemented to realize one or more of the following potential advantages. A wireless communication device may avoid having multiple RF chains activated until they are needed. By reducing the number of RF chains that are activated, power saving may be realized at the wireless communication device. The signaling may provide better time coordination for auxiliary links based on warm up time used by a non-AP MLD to activate an RF chain for an auxiliary link.

FIG. 1 shows a pictorial diagram of an example wireless communication network. FIG. 1 includes a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11aa, 802.11ah, 802.11ad, 802.11aq, 802.11ay, 802.11ax, 802.11az, 802.11ba and 802.11be). The WLAN 100 may include numerous wireless communication devices such as an access point (AP) 102 and multiple stations (STAs) 104 that have a wireless association with the AP 102. In addition, there may be STAs (not shown) that do not have a wireless association with the AP 102. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a BSS, which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacon frames ("beacons") including the BSSID to enable any STAs 104 within wireless range of the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP. The AP 102 may provide access to external networks to various STAs 104 in the WLAN via respective communication links 106. To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

FIG. 1 additionally shows an example coverage area 108 of the AP 102, which may represent a basic service area (BSA) of the WLAN 100. As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 109. Additionally, two STAs 104 may communicate via a direct communication link 109 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 109 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs).

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 520 MHz by bonding together multiple 20 MHz channels.

Each PPDU is a composite structure that includes a PHY preamble and a payload in the form of a PLCP service data unit (PSDU). For example, the PSDU may include a PLCP preamble and header as well as one or more MAC protocol data units (MPDUs). The information provided in the PHY preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
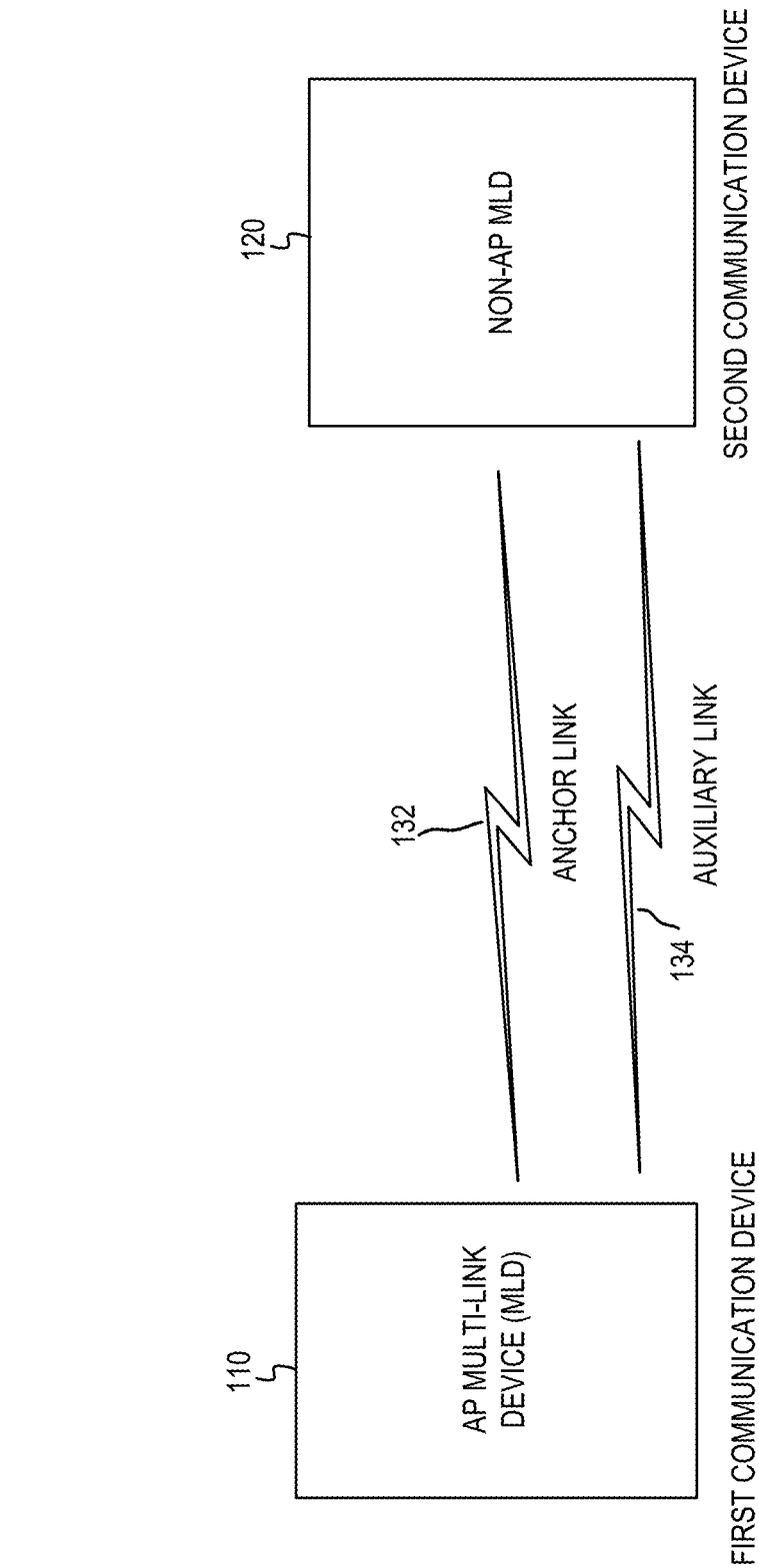
FIG. 2A shows a pictorial diagram of a multi-link association.

FIG. 2A shows a pictorial diagram of a multi-link association. A first wireless communication device (such as an AP entity, or AP) may hereinafter be referred to as an AP MLD 110. The AP-MLD 110 may be capable of establishing a multi-link association with a second wireless communication device (such as a non-AP entity, or STA) which may hereinafter be referred to as a non-AP MLD 120. In some implementations, the non-AP MLD 120 may be an IoT device. The non-AP MLD 120 may be capable of establishing the multi-link association with the AP-MLD 110.

FIG. 2A shows a first link (referred to as an anchor link 132) and a second link (referred to as an auxiliary link 134) between the AP MLD 110 and the non-AP MLD 120. Although only one auxiliary link 134 is shown in FIG. 2A, some implementations may include multiple auxiliary links (not shown). The anchor link 132 may be used for control and signaling between the AP MLD 110 and the non-AP MLD 120.

The different links 132 and 134 may share a common association identifier (AID). In some implementations, the AP MLD 110 may provide different association identifiers (AIDs) for the different links 132 and 134 to the non-AP MLD even though the multi-link association is considered one common association. For example, the AP MLD may assign a first AID for the anchor link 132 and a second AID for the auxiliary link 134. The non-AP MLD 120 may determine whether the auxiliary link 134 should be activated based on the existence of the second AID in a traffic indication map (TIM) message or other message from the AP MLD 110. Alternatively, or additionally, the AP MLD 110 may assign different Link IDs to the different links 132 and 134. The Link ID may be shorter than a size of a traditional AID.

In accordance with this disclosure, the AP MLD 110 (or the non-AP MLD 120) may selectively activate or deactivate the auxiliary link 134. For example, the non-AP MLD 120 may send a request or indication of data requirements that cause the AP MLD 110 to determine that the anchor link 132 is insufficient for the amount of data. Alternatively, the AP MLD 110 may have downlink data to send to the non-AP MLD 120 and may determine to activate the auxiliary link 134 based on the amount of downlink data.

In some implementations, the anchor link 132 may be established on a more reliable frequency band (such as 2.4 GHz) while the auxiliary link 134 may be established on a faster (but potentially less reliable) frequency band (such as the 5 GHZ band or 6 GHz band). In some implementations, the 6 GHz band may be a fully scheduled frequency band, and the anchor link 132 may be used to signal resource requirements regarding a TID such that the AP MLD 110 and the non-AP MLD 120 can selectively activate the auxiliary link 134 when there is traffic to send for the TID. Although described as different channels or different bands in this disclosure, other examples of links may include spatial streams or any combination of different channels, bands, or spatial streams.

In some implementations, the non-AP MLD 120 may be a multi-radio device which can operate on multiple channels or frequency bands concurrently. For example, the non-AP MLD 120 may have separate interfaces to concurrently utilize the anchor link 132 and the auxiliary link 134. The separate interfaces may be implemented in a common chip or component having separate radios for each interface.

Each radio may have an RF chain connected to a one or more antennas different from another radio. When implemented as a multi-radio device, the non-AP MLD 120 may be capable of concurrently communicating via the anchor link 132 and the auxiliary link 134.

In some implementations, the non-AP MLD 120 may be a single-radio device. The non-AP MLD 120 may switch the radio to alternatively communicate via one of the links 132 and 134. The non-AP MLD 120 may be referred to as a multi-link capable single-radio (MLSR) device. When the auxiliary link 134 is activated, the auxiliary link 134 may be promoted to become the anchor link for signaling purposes until the auxiliary link 134 is deactivated and the original anchor link 132 is activated. Thus, anchor link may be the link that is currently activated and which the non-AP MLD 120 has a STA interface in an active or awake state. Those links which are associated with a STA interface in a doze state may be designated as auxiliary links. The designation of which link is the anchor link may be implicit based on activation of a link. In some implementations, the AP MLD 110 and the non-AP MLD 120 may transfer of all TID flows to a different link, and that link may be designated that link as the anchor link. In a multi-link association, the AP MLD 110 and the non-AP MLD 120 may negotiate and pre-configure more than one link for use between them regardless of whether the non-AP MLD 120 has one radio or multiple radios.

As stated previously, a designation of an anchor link for a multi-link association may be changed. Either the AP MLD or the non-AP MLD may implicitly or explicitly signal a change in the multi-link association to designate one of the links as the anchor link. When the AP MLD has established multi-link associations with different non-AP MLDs, the anchor link for each non-AP MLD may be in the same wireless channel or in different wireless channels. For example, it is possible that two non-AP MLDs associated with the same AP MLD have their respective anchor links in different BSSs of the AP MLD.

Figure 2B:
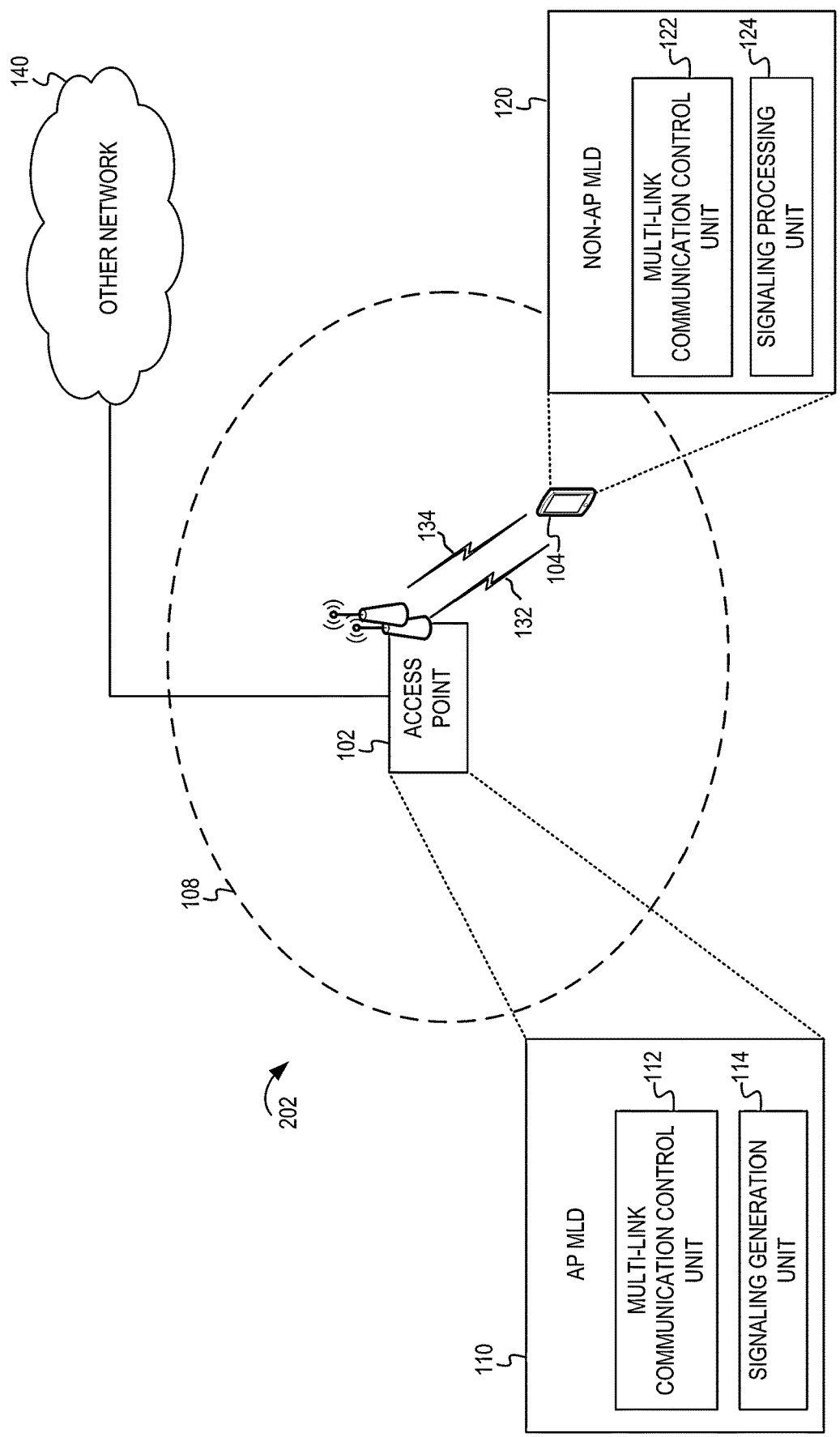
FIG. 2B shows a pictorial diagram of an example wireless communication network that implements multi-link communication.

FIG. 2B shows a pictorial diagram of an example wireless communication network that implements multi-link communication. In FIG. 2B, the AP 102 may be an AP MLD 110. The STA 104 may be a non-AP MLD 120.

The AP MLD 110 may include a multi-link communication control unit 112 and a signaling generation unit 114. The multi-link communication control unit 112 may implement the multi-link association in accordance with aspects of this disclosure. The signaling generation unit 114 may prepare and communicate the signaling described herein. The non-AP MLD 120 may include a multi-link communication control unit 122 and a signal processing unit 124. The multi-link communication control unit 122 may implement the multi-link association in accordance with aspects of this disclosure. In some instances, the AP MLD 110 and the non-AP MLD 120 may exchange service discovery frames or other management frames to ascertain whether both devices support the multi-link association and signaling as described herein.

A technical standard may define formats for communications. For example, the first wireless communication device may prepare and transmit a media access control (MAC) protocol data unit (MPDU) according to a standardized format. An MPDU also may be referred to as a frame or a packet in some aspects of this disclosure. A physical convergence layer (PHY) protocol data unit (PPDU) may include one or more MPDUs. For example, one type of PPDU (referred to as an Aggregated MPDU, or A-MPDU) may include multiple MPDUs in a payload of the AMPDU.

FIG. 3A shows an example protocol data unit (PDU) 300 usable for communications between an AP and a number of STAs. For example, the PDU 300 can be configured as a PPDU. As shown, the PDU 300 includes a PHY preamble 302 and a PHY payload 304. For example, the PHY preamble 302 may include a legacy portion that itself includes a legacy short training field (L-STF) 306, a legacy long training field (L-LTF) 308, and a legacy signaling field (L-SIG) 310. The PHY preamble 302 also may include a non-legacy portion (not shown). The L-STF 306 generally enables a receiving device to perform automatic gain control (AGC) and coarse timing and frequency estimation. The L-LTF 308 generally enables a receiving device to perform fine timing and frequency estimation and also to estimate the wireless channel. The L-SIG 310 generally enables a receiving device to determine a duration of the PDU and use the determined duration to avoid transmitting on top of the PDU. For example, the L-STF 306, the L-LTF 308 and the L-SIG 310 may be modulated according to a binary phase shift keying (BPSK) modulation scheme. The payload 304 may be modulated according to a BPSK modulation scheme, a quadrature BPSK (Q-BPSK) modulation scheme, a quadrature amplitude modulation (QAM) modulation scheme, or another appropriate modulation scheme. The payload 304 may generally carry higher layer data, for example, in the form of medium access control (MAC) protocol data units (MPDUs) or an aggregated MPDU (A-MPDU).

FIG. 3B shows an example L-SIG field 310 in the PDU of FIG. 3A. The L-SIG 310 includes a data rate field 312, a reserved bit 314, a length field 316, a parity bit 318, and a tail field 320. The data rate field 312 indicates a data rate (note that the data rate indicated in the data rate field 312 may not be the actual data rate of the data carried in the payload 304). The length field 316 indicates a length of the packet in units of, for example, bytes. The parity bit 318 is used to detect bit errors. The tail field 320 includes tail bits that are used by the receiving device to terminate operation of a decoder (for example, a Viterbi decoder). The receiving device utilizes the data rate and the length indicated in the data rate field 312 and the length field 316 to determine a duration of the packet in units of, for example, microseconds (μs).

Figure 4A:
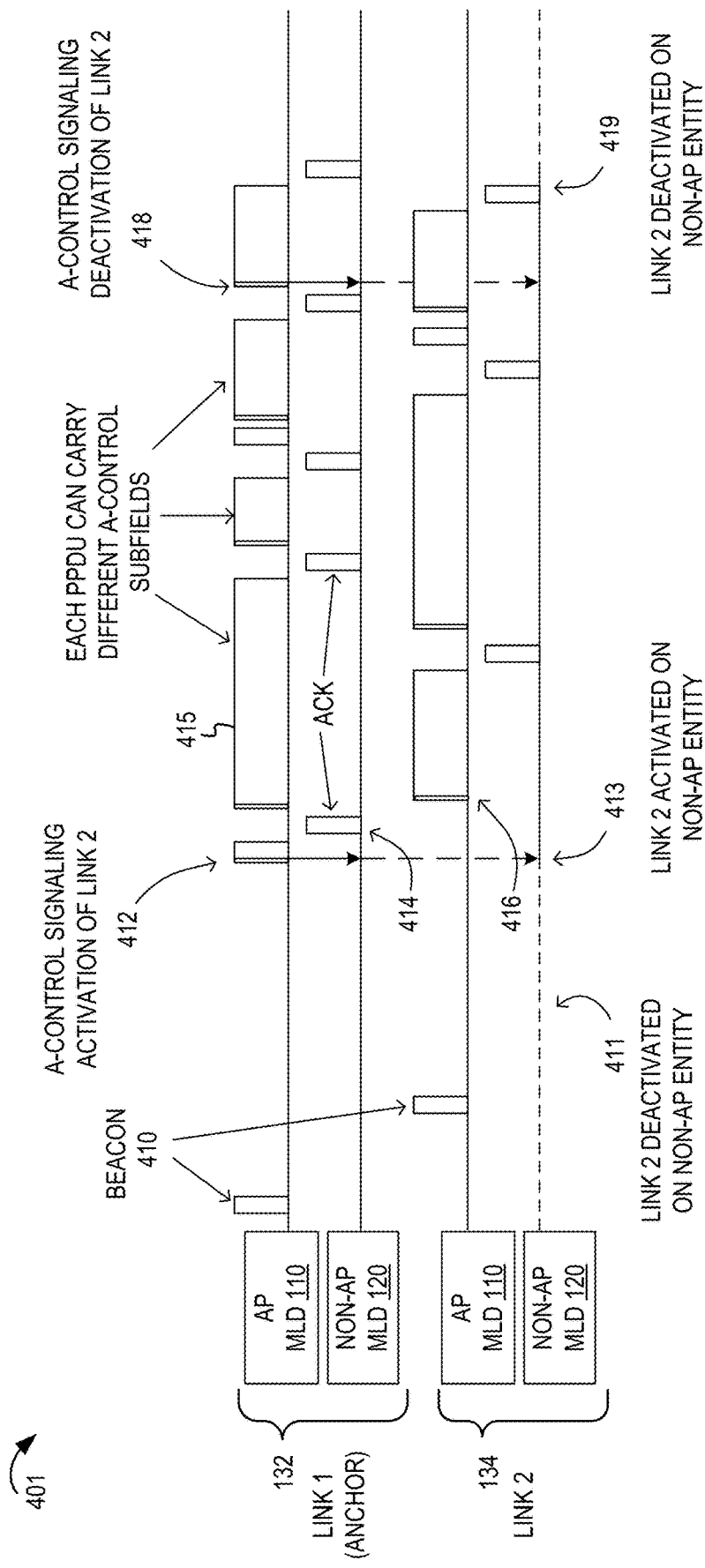
FIG. 4A shows a pictorial diagram of example signaling to activate a link of a multi-link association using one or more individually addressed frames.

FIG. 4A shows a pictorial diagram 401 of example signaling to activate a link of a multi-link association using one or more individually addressed frames. An AP MLD 110 and a non-AP MLD 120 may establish a multi-link association that includes configuration for a first link (Link 1, referred to as an anchor link 132) and a second link (Link 2, referred to an auxiliary link 134). The AP MLD 110 may periodically transmit beacon frames 410 to maintain synchronization of the various links. The non-AP MLD 120 may observe the beacon frames 410 on the anchor link 132 and may or may not observe beacon frames on the auxiliary link 134. In some implementations, the non-AP MLD 120 may maintain the auxiliary link 134 in a deactivated state 411 until it receives signaling from the AP MLD 110 to activate the auxiliary link 134 or until it has data to transmit via the auxiliary link 134. The AP MLD 110 may use signaling (such as in an A-Control field) on the anchor link 132 to activate the auxiliary link 134). For example, a first frame 412 may include an A-Control field or other indicator to inform the non-AP MLD 120 to activate the auxiliary link 134. When the auxiliary link 134 is activated (by either the AP MLD 110 or the non-AP MLD 12), the non-AP MLD 120 may cause its STA interface for the auxiliary link 134 to change from a doze state to an awake state. In some implementations, the non-AP MLD 120 may send an acknowledgement (ACK) 414 on the anchor link 132 to acknowledge the activation 413 of the auxiliary link 134. Data (such as a data frame 415) may be sent on both links when they are both activated. At some point, the AP MLD 110 may signal an instruction or indicator to for the non-AP MLD 120 to deactivate the auxiliary link 134. For example, An A-control field or other indicator in a header of a data frame 418 may inform the non-AP MLD 120 to deactivate the auxiliary link 134. The non-AP MLD 120 may deactivate 419 the non-AP MLD 120 at the conclusion of a next packet exchange or acknowledgment.

Notice that the timing for a first communication 416 on the auxiliary link 134 may be delayed to accommodate a warm up time for the associated STA interface of non-AP MLD 120 to activate 413 the auxiliary link. In some implementations, the non-AP MLD 120 may send a configuration value to indicate the warm up time in a configuration or negotiation message (such as when the multi-link association is first established). Alternatively, the ACK from the non-AP MLD 120 may indicate that the non-AP MLD 120 is ready to receive communication on the auxiliary link 134. Alternatively, or additionally, the delay before the first communication 416 may be in the form of initial padding data in the first communication 416 before data intended for the non-AP MLD 120.

Figure 4B:
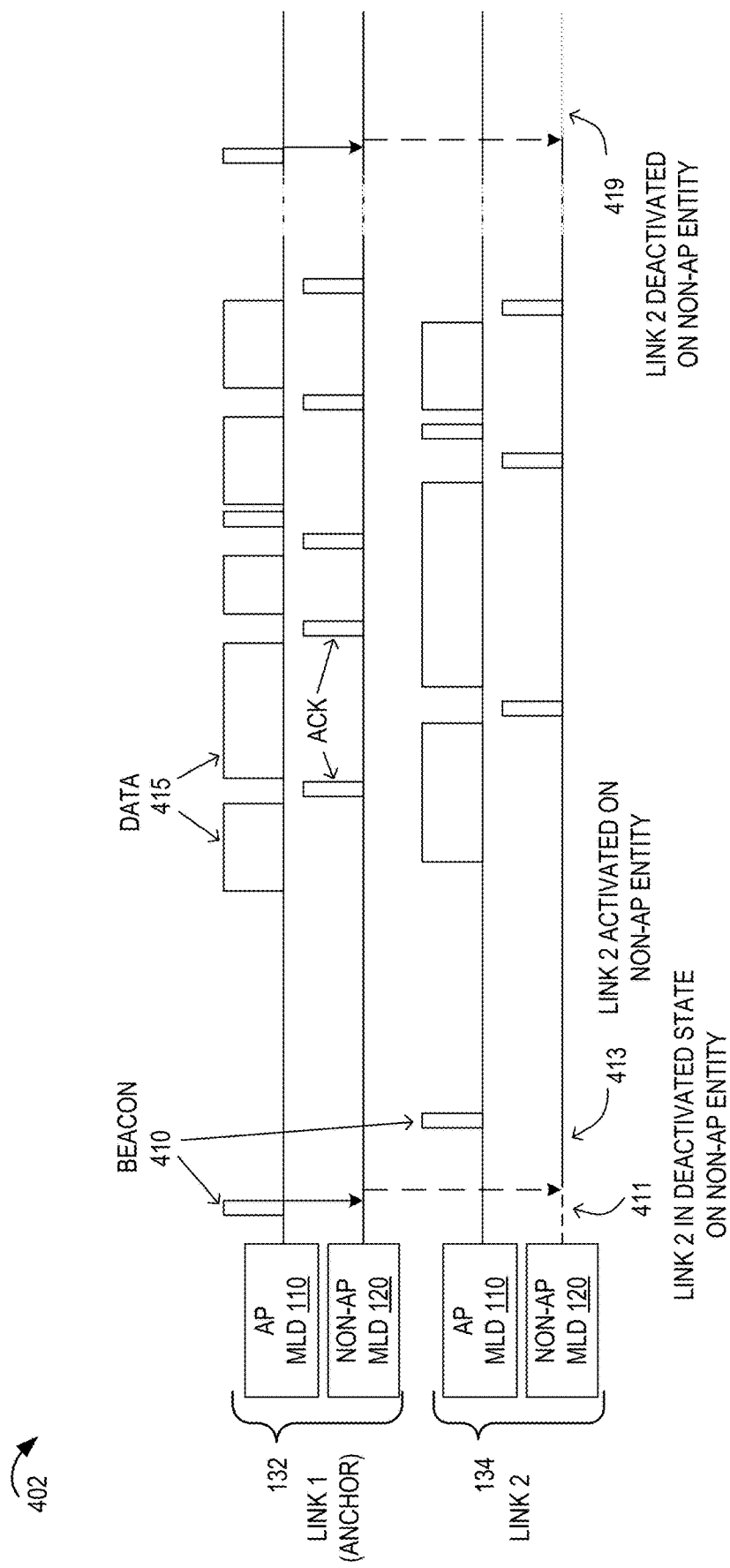
FIG. 4B shows a pictorial diagram of example signaling to activate a link of a multi-link association using a broadcast frame.

FIG. 4B shows a pictorial diagram 402 of example signaling to activate a link of a multi-link association using a broadcast addressed frame. In this example, the non-AP MLD 120 may periodically wake up an auxiliary link 134 to receive broadcast frames (such as Beacon Frames 410) and determine whether the Beacon Frame 410 includes an indicator to activate the auxiliary link 134. For example, the broadcast frame may indicate traffic associated with a TID that is mapped to the auxiliary link 134. Initially, the non-AP MLD 120 may have the auxiliary link 134 in a deactivated state 411, such that the STA interface for the auxiliary link 134 is in a power saving mode or doze state. Upon detecting the indicator in a Beacon Frame 410 to activate the auxiliary link 134, the non-AP MLD 120 may activate 413 the auxiliary link 134. Data 415 may be sent via both the anchor link 132 and the auxiliary link 134. In some implementations, the non-AP MLD 120 may send a message to the AP MLD 110 to indicate which links (such as one or both of the anchor link 132 and the auxiliary link 134) that non-AP MLD 120 will be available to receive the data 415. After the data 415 has been transmitted, at some point the non-AP MLD 120 may deactivate 419 the auxiliary link 134 to conserve power.

Figure 4C:
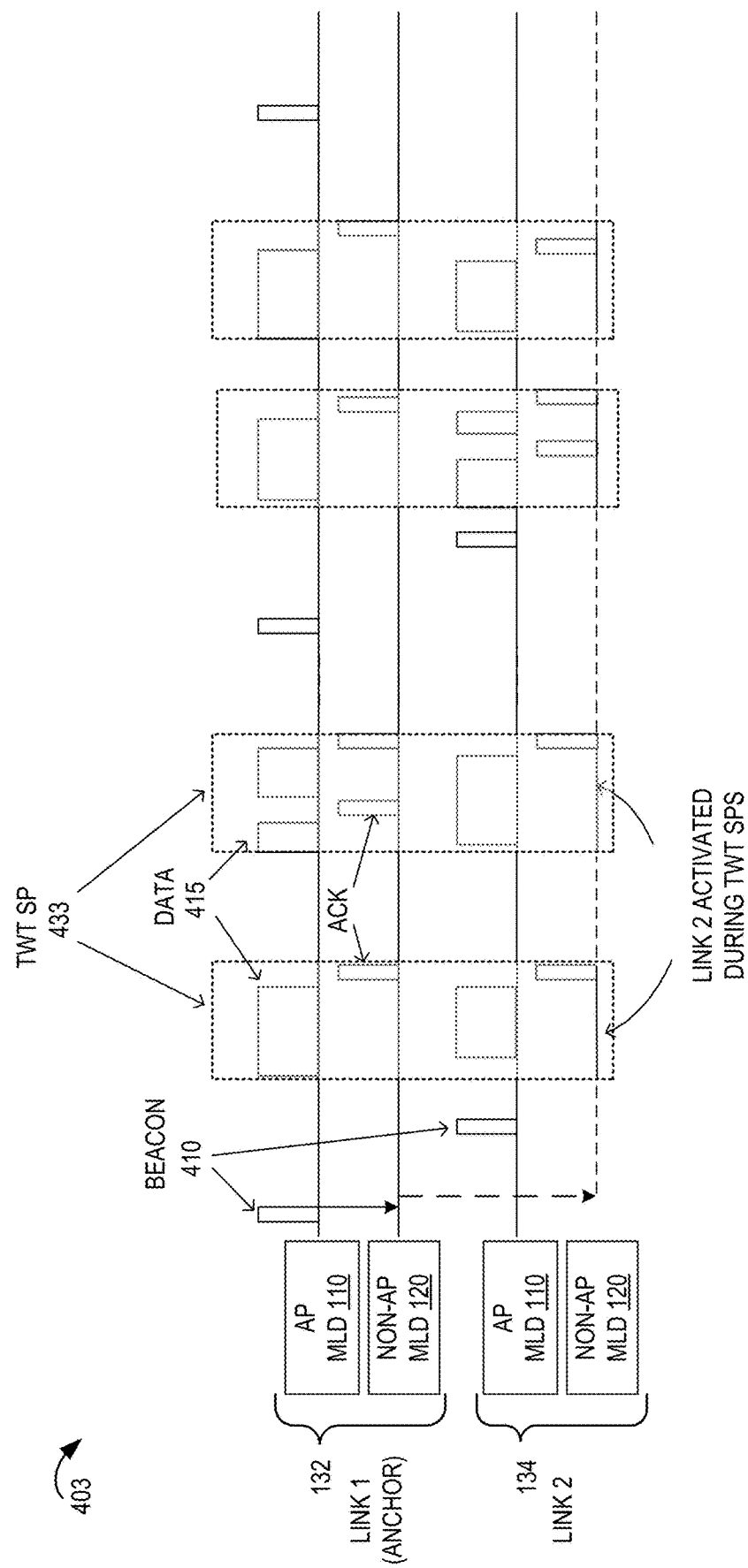
FIG. 4C shows a pictorial diagram of example signaling regarding target wake time (TWT) coordination in multi-link communication.

FIG. 4C shows a pictorial diagram 403 of example signaling regarding target wake time (TWT) coordination in multi-link communication. The non-AP MLD 120 may negotiate TWT schedules during which the auxiliary links 134 are activated. The TWT schedule may define TWT service periods (TWT SPs) 433 for communication via the anchor link 132 and the auxiliary link 134. The schedules for TWTs of the anchor link 132 and the auxiliary link 134 may be aligned (as shown in FIG. 4C) or may not be aligned. During the TWTs, the AP MLD 110 may signal whether the auxiliary link 134 should remain activated or should be deactivated.

Figure 4D:
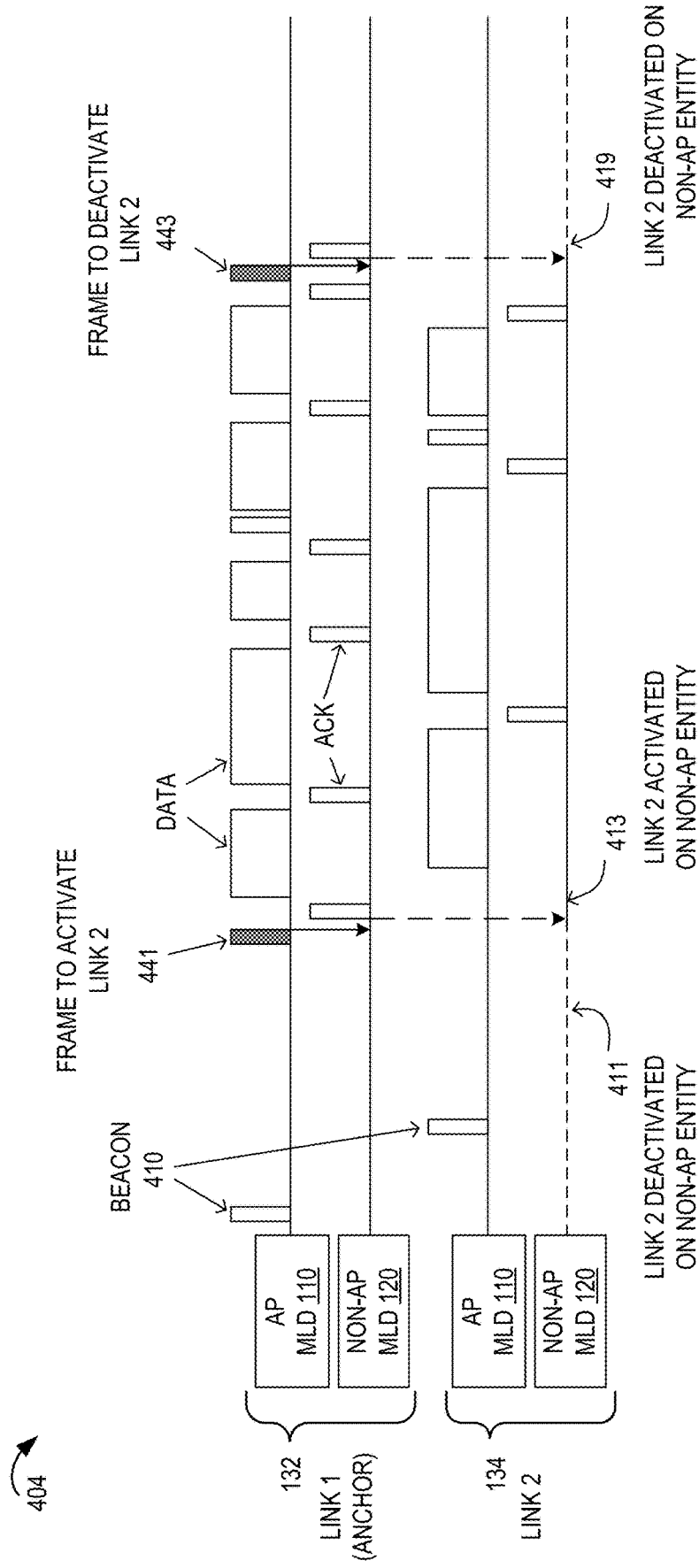
FIG. 4D shows a pictorial diagram of example signaling regarding timing to activate a link of a multi-link association.

FIG. 4D shows a pictorial diagram 404 of example signaling regarding timing to activate a link of a multi-link association. The example of FIG. 4D shows explicit frames 441 and 442 on the anchor link 132 to indicate that the auxiliary link 134 should be activated 413 and deactivated 419, respectively. Thus, the AP MLD 110 may explicitly manage the activation and deactivation of the auxiliary link 134 using management or control frames.

Figure 4E:
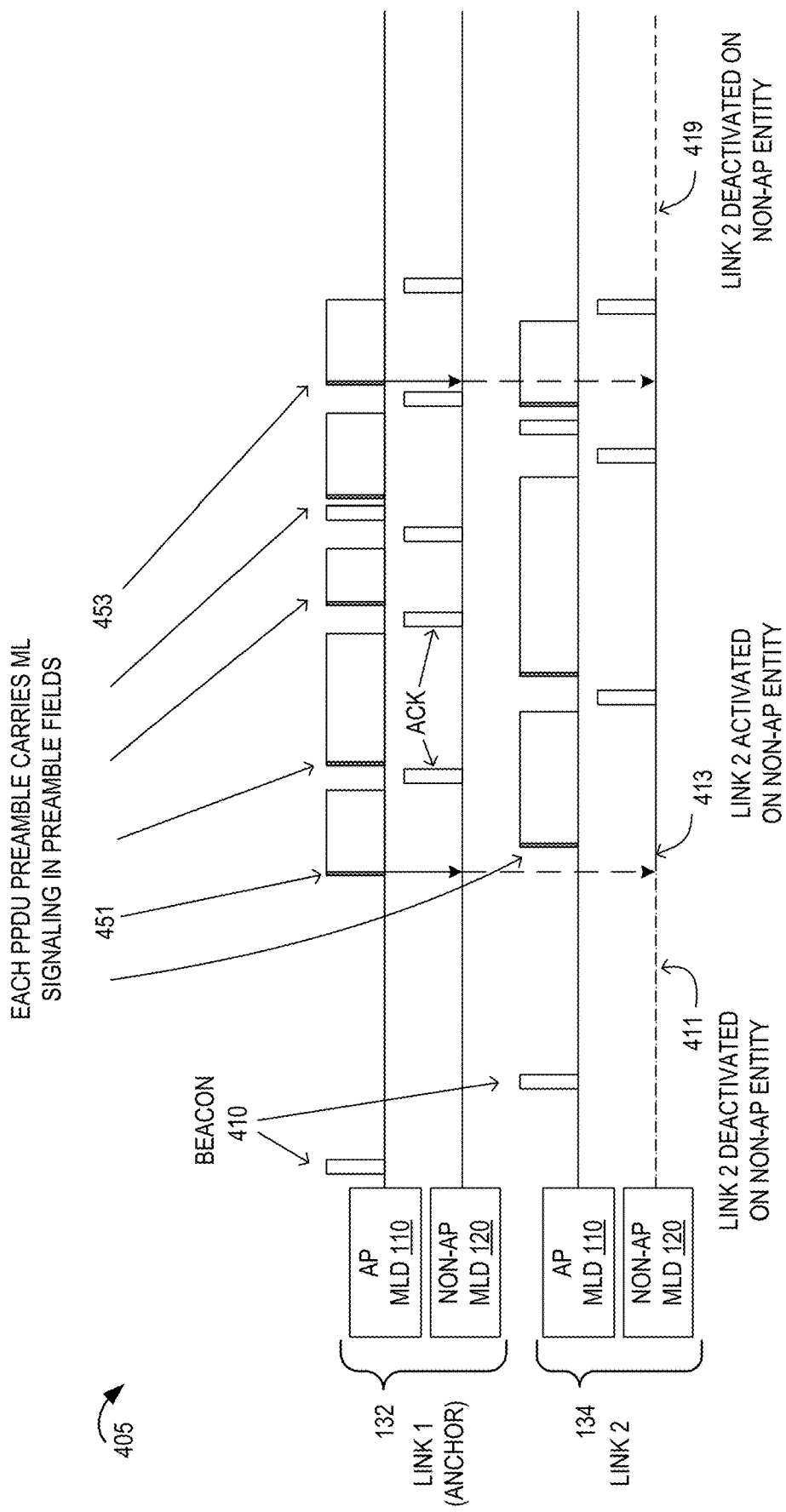
FIG. 4E shows a pictorial diagram of example signaling to activate a link of a multi-link association using a preamble indicator.

FIG. 4E shows a pictorial diagram 405 of example signaling to activate a link of a multi-link association using a preamble indicator. One or more bits in the preamble of a PPDU from the AP MLD 110 may indicate an instruction to for the non-AP MLD 120 to activate 413 the auxiliary link 134. In some implementations, each PPDU may include signaling to instruct the non-AP MLD 120 to activate or deactivate the auxiliary link 134. In some implementations, the signaling may be a traffic indicator and the non-AP MLD 120 may infer that the auxiliary link 134 should be activated to receive the traffic. In the example of FIG. 4E, a first data frame includes a preamble 451 causing the non-AP MLD 120 to activate 413 the auxiliary link 134. Data may be transmitted via the anchor link 132 and the auxiliary link 134. In a subsequent PPDU, the AP MLD 110 may include a preamble 453 that causes the non-AP MLD 120 to deactivate 419 the auxiliary link 134. For example, when sending the last packet of buffered data, the AP MLD 110 may include the deactivation indicator in the preamble 453 of that last packet.

Figure 5A:
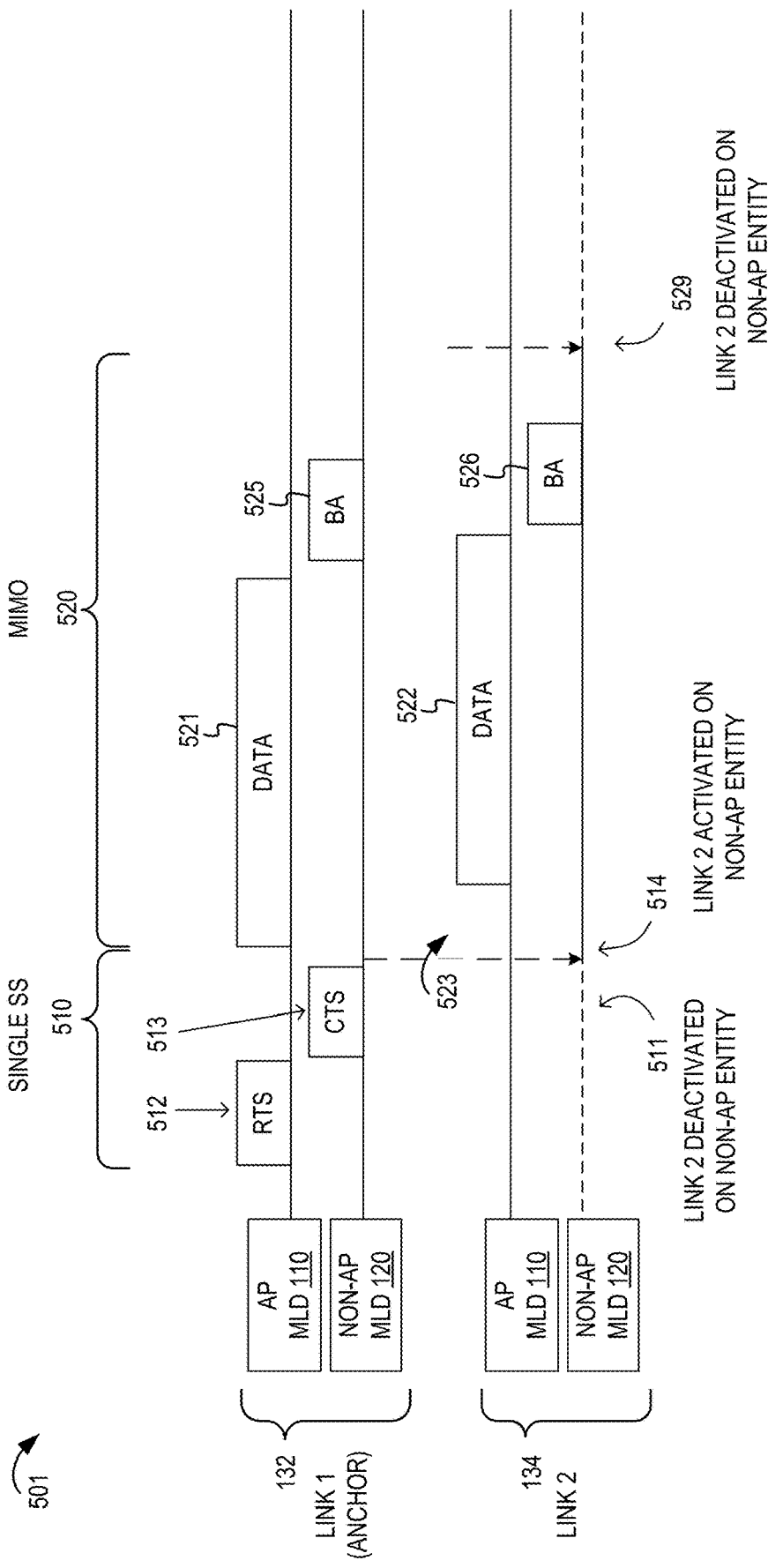
FIG. 5A shows a pictorial diagram of example signaling for downlink communication in a multi-link association with spatial multiplexing.

FIG. 5A shows a pictorial diagram 501 of example signaling for downlink communication in a multi-link association with spatial multiplexing. In spatial multiplexing, the AP MLD 110 and the non-AP MLD 120 may use multiple-input-multiple-output (MIMO) to establish SS spatial streams. The quantity of spatial streams may be based on the number of transmit antennas Ntx and the number of receive antennas Nrx. While spatial multiplexing may support greater throughput, the use of spatial multiplexing utilizes more processing capability (and thus more power) at the MLDs. The non-AP MLD 120 may be powered by a battery and therefore it may be desirable to limit power consumption when possible. FIG. 5A shows an example of power saving in which single stream processing is used for times when little or no data is being communicated and MIMO can be enabled when more data is being communicated.

Initially, the auxiliary link 134 may be in a deactivated state 511. Furthermore, the AP MLD 110 and the non-AP MLD 120 may use single stream (non-MIMO) communication for maintaining the anchor link 132 until there is data to communicate. Because the example of FIG. 5A is based on downlink (DL) communication from the AP MLD 110 to the non-AP MLD 120, the AP MLD 110 may initiate the DL communication by transmitting a request to send (RTS) 512 message to alert the non-AP MLD 120 of the pending DL communication. The non-AP MLD 120 may respond with a clear to send (CTS) 513 message. Both the RTS message 512 and the CTS message 513 are relatively simple and short communications, so MIMO is not needed for those communications. However, once the non-AP MLD 120 receives the RTS message 512 and either after sending or currently with sending the CTS message 513, the non-AP MLD 120 may activate 514 the auxiliary link 134. Furthermore, the non-AP MLD 120 may change the configuration of its RF chain to utilize MIMO communication for SS spatial streams. There may be a delay 523 (such as a short interframe space, SIFS, duration) before the AP MLD 110 transmits the MIMO communication via the auxiliary link 134. This delay 523 may be based on an amount of time for the non-AP MLD 120 to activate the auxiliary link 134 as well as the amount of time for the non-AP MLD 120 to configure its radio interface for MIMO communication 520. The AP MLD 110 may transmit spatial multiplexed data 521 and 521 via the anchor link 132 and the auxiliary link 134, respectively. In some implementations, the non-AP MLD 120 may respond with block acknowledgements (BA 525 and 526) on the respective links 132 and 134. At some point (such as following a time period after the completion of the last data transmission), the non-AP MLD 120 may deactivate the auxiliary link 134 and revert to non-MIMO operation to conserve power.

As another example, the non-AP MLD 120 may activate multiple RX chains when it receives start of a frame exchange. The frame exchange sequence starts with individually addressed frame sent to the non-AP MLD 120. The frame exchange sequence may require an immediate response (RTS/CTS in the example). The individually addressed frame may be sent with one spatial stream (for example).

Thereafter, the frame exchange sequence with the non-AP MLD 120 can continue with frames that are sent with multiple spatial streams in link 1 (anchor link 132). In some implementations, a separation of 1 SS TX to >1 SS RX frames can be SIFS. The frames that are sent with multiple spatial streams may be in link 2 (auxiliary link 134). Activation of the auxiliary link 134 may occur at or after the time of activating multiple SS in link 1.

Termination of exchange sequence in each link can be independent & identified by reception of frame addressed to another non-AP MLD (not shown), or generated by another non-AP MLD (not shown), a point coordination function (PCF) interframe space (PIFS) or the like, after which the non-AP MLD 120 may switch RX SS to 1 for the anchor link 132 and the auxiliary link 134. And, eventually, the non-AP MLD 120 may deactivate the auxiliary link 134.

Figure 5B:
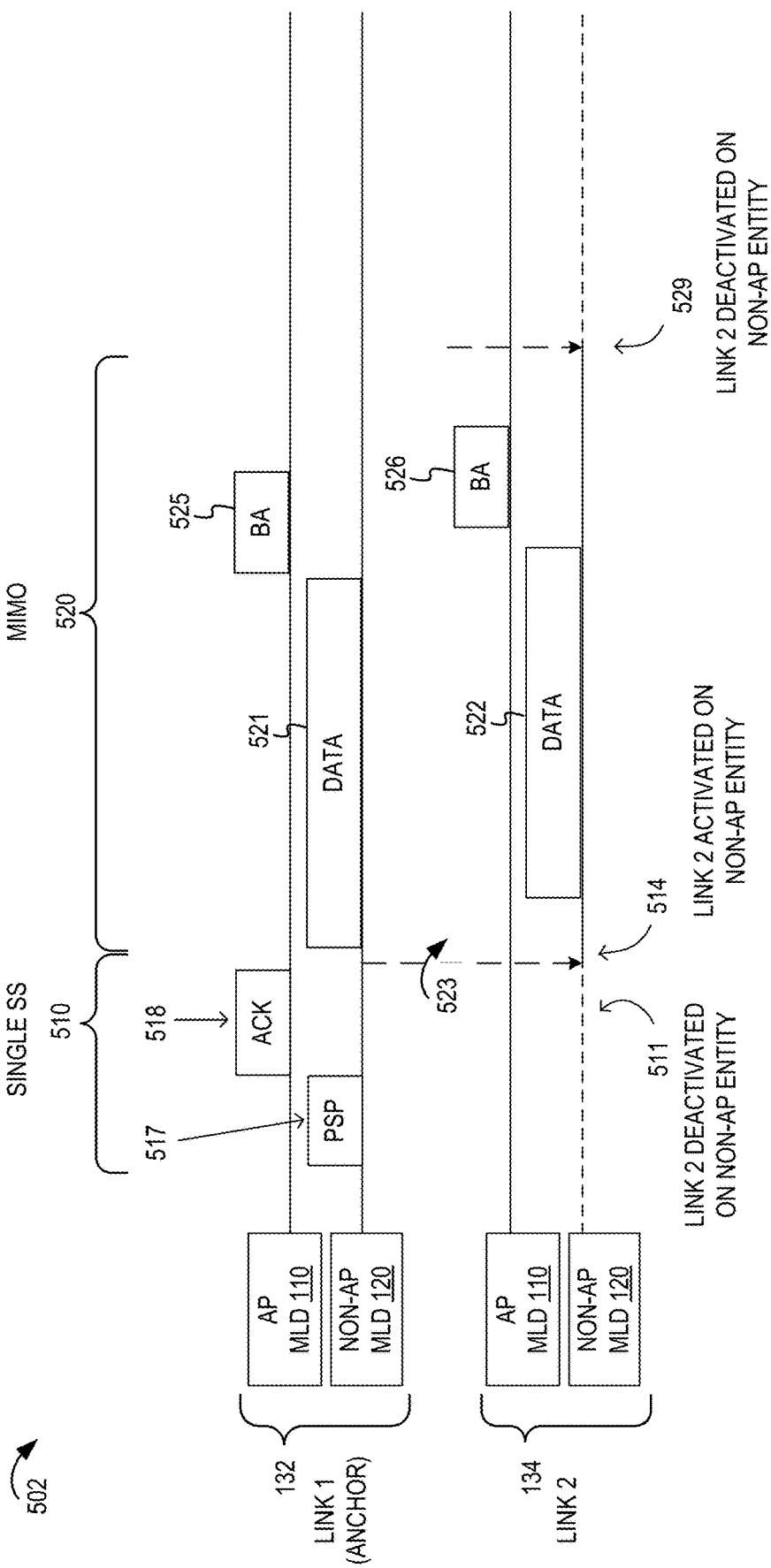
FIG. 5B shows a pictorial diagram of example signaling for uplink communication in a multi-link association with spatial multiplexing.

FIG. 5B shows a pictorial diagram 502 of example signaling for uplink communication in a multi-link association with spatial multiplexing. A non-AP MLD 120 may send a power save poll (PS-Poll, or PSP 517), a quality of service null (QoS Null), an RTS, or other message via the anchor link 132 to initiate an uplink communication. The AP MLD 110 may respond with an acknowledgement 518 or other message to indicate that the anchor link 132 and the auxiliary link 134 are available for multi-link UL communication. Based on the ACK message 518, the non-AP MLD 120 may activate 514 the auxiliary link 134 and transmit UL data 521 and 522 via the anchor link 132 and the auxiliary link 134, respectively. As described in FIG. 5A, there may be a delay 523 before transmission of the data 522 on the auxiliary link 134 to provide time for activation 514 of the auxiliary link 134 and the SS for UL MIMO 520. Similar to FIG. 5A, the non-AP MLD 120 may deactivate 529 the auxiliary link 134 after a time period following the uplink MIMO communication.

Figure 5C:
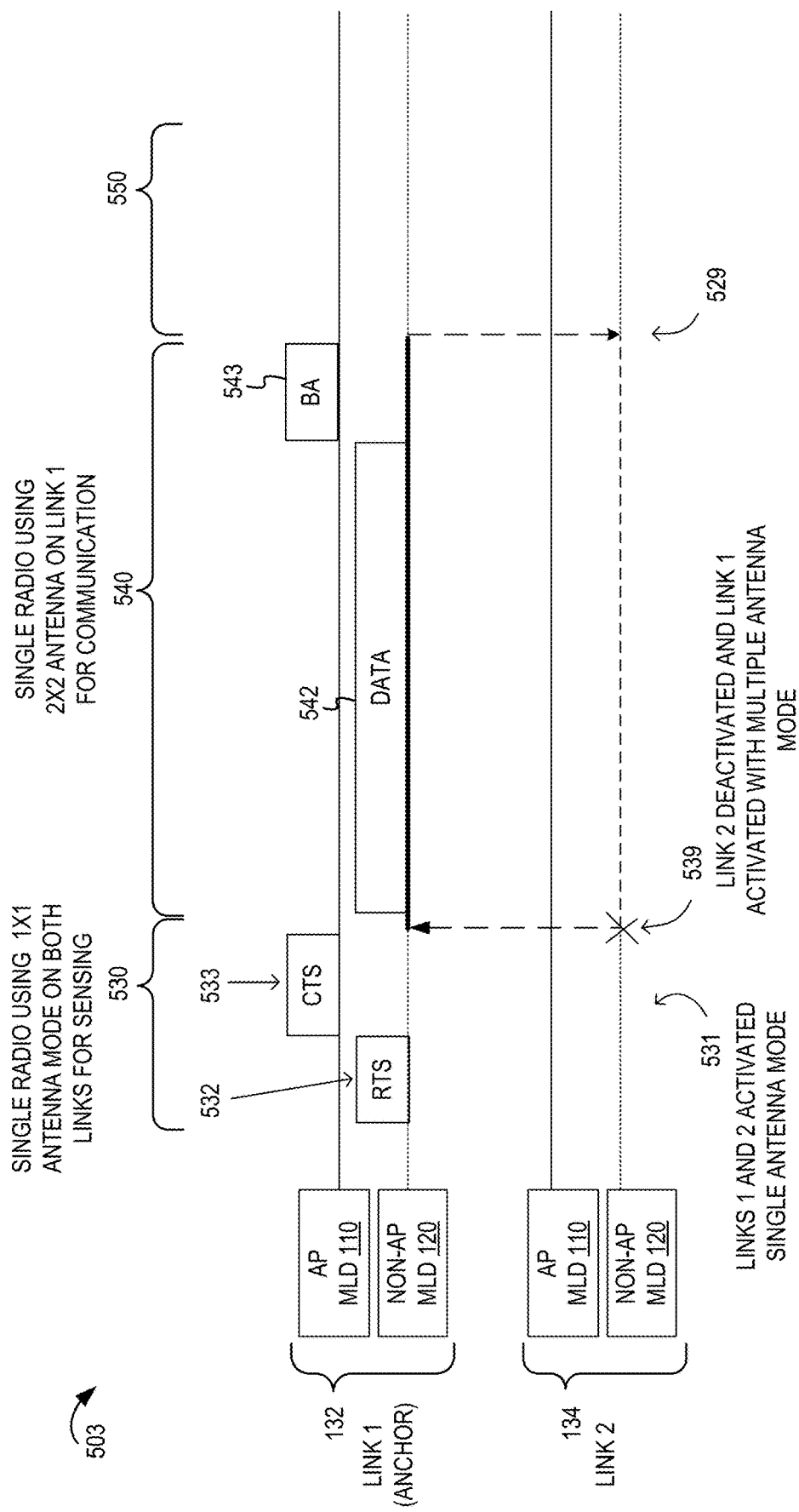
FIG. 5C shows a pictorial diagram of an enhanced multi-link single radio (eMLSR) technique for a multi-link device (MLD) that has a single radio with multiple available antennas.

FIG. 5C shows a pictorial diagram 503 of an enhanced multi-link single radio (eMLSR) technique for an MLD that has a single radio with multiple available antennas. For example, the non-AP MLD 120 may have 2 or more antennas for use with MIMO but only a single radio. The non-AP MLD 120 may use an antenna to concurrently sense for basic signals on both the anchor link 132 and the auxiliary link 134. For example, the non-AP MLD 120 may use a 1×1 (single antenna) mode to detecting energy on the links 132 and 134 when the non-AP MLD 120 is idle. Upon detecting an RTS form the AP MLD 110 or sending an RTS 532, the non-AP MLD 120 may switch from 1×1 on both links to a 2×2 mode on just one of the links. In the example in FIG. 5C, the non-AP MLD 120 initiates UL MIMO communication by sending an RTS 532 and receiving a CTS 533 via the anchor link 132. These messages may be sent using single antenna (SS=1) communication. When sending the data 542 to the AP MLD 110 (or receiving data from the AP MLD 110), the non-AP MLD 120 may deactivate one of the links so that multiple antennas may be used with the single radio on just one of the links. In the example of FIG. 5C, the non-AP MLD 120 deactivates 539 the auxiliary link 134 and uses the antenna that was previously configured in 1×1 mode for that link with the antenna that was previously configured in 1×1 mode for the anchor link 132 to form a 2×2 mode using both antennas on the anchor link 132. The non-AP MLD 120 may send the data 542 using the 2×2 mode. During UL MIMO communication 520, because the non-AP MLD 120 in this example is a single-radio device, it cannot transmit or receive via the auxiliary link 134. However, having the ability to configure a single radio device as a non-AP MLD 120 may be advantageous for the seamless establishment and multi-link association between the single-radio non-AP MLD 120 and the AP MLD 110. Even though the non-AP MLD 120 may only use one of the links at a time, having both links configured may provide flexibility to adjust which frequency band or spatial stream configuration to use based on type or amount of traffic.

Figure 6A:
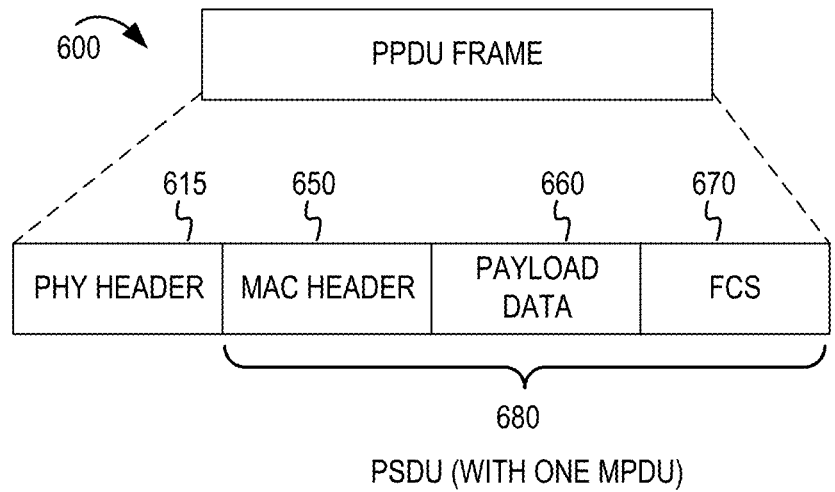
FIG. 6A shows a diagram of an example physical layer convergence procedure (PLCP) protocol data unit (PPDU) frame.

FIG. 6A is a diagram illustrating an example physical layer convergence procedure (PLCP) protocol data unit (PPDU) frame 600. As shown in FIG. 6A, the PPDU frame 600 includes a physical layer (PHY) header 615 and one or more PLCP service data units (such as PSDU 680). Each of the PSDUs may be addressed to a receiver (individually addressed), a group of receivers (group addressed) or to all receivers (broadcast addressed). Similarly, it may be sent by a transmitter, a group of transmitters, or all transmitters, or a combination of both. The PDSU 680 includes zero or more MPDUs. In FIG. 6A, the PSDU 680 includes one MPDU. Each MPDU may include one or more of the following fields: a MAC header field 650, a payload/data field 660, and a frame check sequence (FCS) field 670. The PSDU 680 also may be referred to as a payload portion 680 of the PPDU frame 600. The PHY header 615 may be used to acquire an incoming signal (such as an OFDMA signal), to train and synchronize a demodulator, and may aid in demodulation and delivery of the payload portion 680.

In some implementations, the MPDUs may be included in the PSDU 680 as part of an aggregated MPDU (A-MPDU).

Figure 6B:
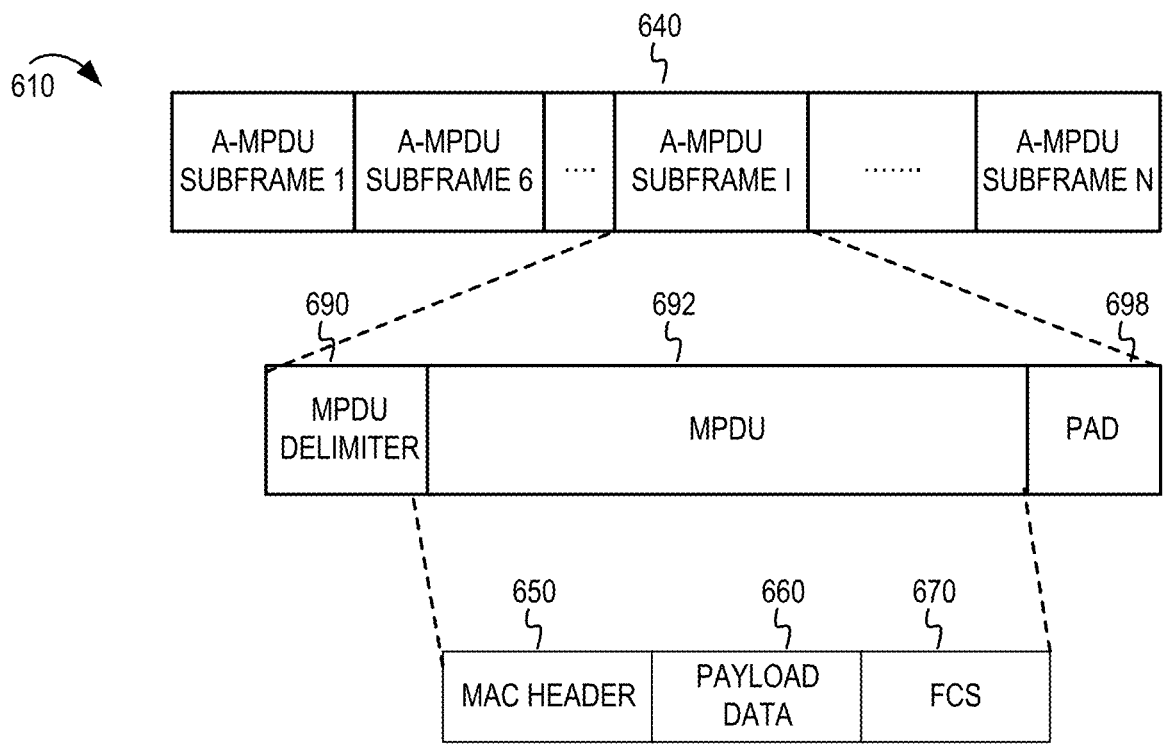
FIG. 6B shows a diagram of an example aggregated media access control (MAC) protocol data unit (A-MPDU) frame.

FIG. 6B shows a diagram of an example aggregated media access control (MAC) protocol data unit (A-MPDU) frame. The PHY header 615 is omitted for brevity. Following the PHY header, a series of MPDU may be organized as A-MPDU subframes. Each A-MPDU subframe (such as A-MPDU subframe 640) may include an MPDU delimiter 690, an MPDU 696, and padding 698. The MPDU 692 may have a similar structure as described with regard to FIG. 6A. For example, the MPDU 692 may include one or more of the following fields: a MAC header field 650, a payload/data field 660, and a frame check sequence (FCS) field 670.

Figure 7:
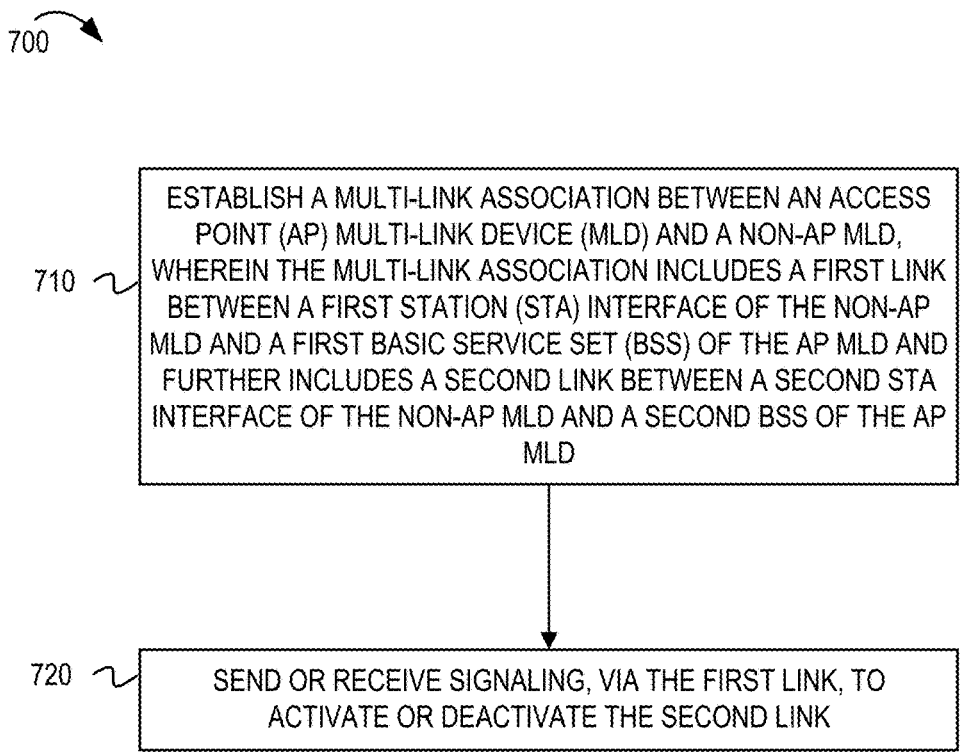
FIG. 7 shows a flowchart illustrating an example process for managing a multi-link association.
Figure 8:
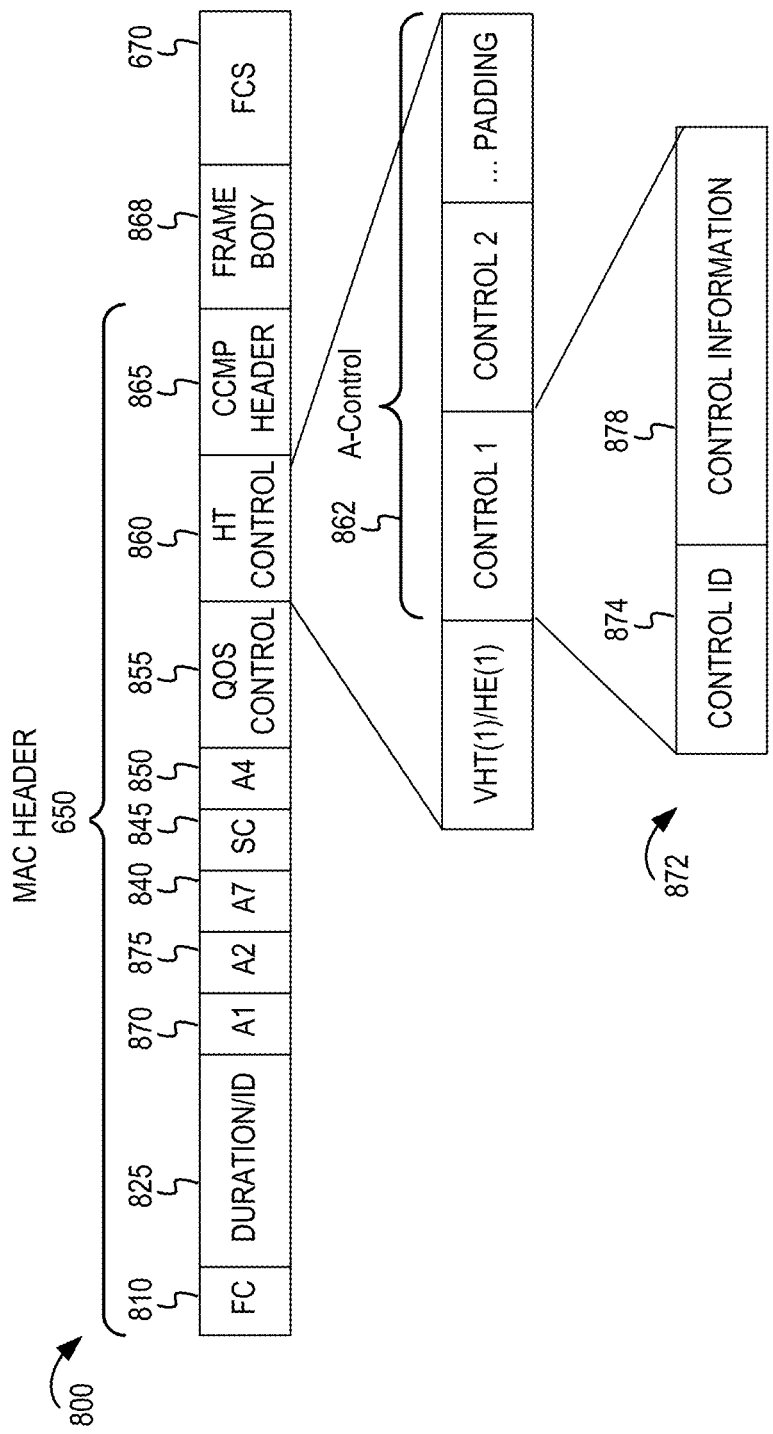
FIG. 8 shows a diagram of an example MAC frame with an Aggregated Control (A-Control) field.

FIG. 7 shows a flowchart illustrating an example process 700 for managing a multi-link association. In some implementations, the process 700 may be performed by a wireless communication device such as an AP MLD or non-AP MLD. In block 710, a wireless communication device may establish a multi-link association between an AP MLD and a non-AP MLD. The multi-link association may include a first link between a first STA interface of the non-AP MLD and a first BSS of the AP MLD and may further include a second link between a second STA interface of the non-AP MLD and a second BSS of the AP MLD. In block 720, the wireless communication device may send or receive signaling, via the first link, to activate or deactivate the second link FIG. 8 shows a diagram of an example medium access control (MAC) frame with an Aggregated Control (A-Control) field. In some implementations, the MAC frame 800 may include a media access control protocol data unit (MPDU) frame. In some implementations, the MAC frame 800 may correspond to the payload portion 680, as previously described in FIG. 6. As shown, the MAC frame 800 includes one or more of several different fields: a frame control (FC) field 810, a duration/identification field 825, a receiver address (A1) field 870, a transmitter address (A2) field 875, a destination address (A3) field 840, a sequence control (SC) field 845, a fourth address (A4) field 850, a quality of service (QOS) control (QC) field 855, a high throughput (HT)/very high throughput (VHT) control field 860, a frame body 868, and a frame check sequence (FCS) field 670. Some or all of the fields 810-865 may make up the MAC header 650 of FIG. 6. In some implementations, a protocol version field of the frame control field 810 of the MAC frame 800 can be 0, or 1 or greater than 1.

The A-Control field 862 may be included in a High Throughput (HT) Control field 860. Alternatively, the A-Control field may be included after the HT Control field or immediately after the CCMP Header (in this latter case the information can be encrypted). Counter Mode Cipher Block Chaining Message Authentication Code Protocol (Counter Mode CBC-MAC Protocol) or CCM mode Protocol (CCMP) is an encryption protocol designed for WLAN devices that implements the standards of the IEEE 802.11i. In the examples of this disclosure, the A-Control field is included in an HT Control field 860. However, other locations for the A-Control field 862 may be possible.

In accordance with this disclosure, an A-Control field may be a Dynamic A-Control field (also referred to as an Enhanced A-Control field). For example, the A-Control field may be a variable-length field in an MPDU. A first portion of the A-Control field may indicate the length of the A-Control field. For example, the first portion may be formatted as a control header (sometimes also referred to as a control delimiter or delimiter). The control header may have a format mimicking a control parameter within the A-Control field. For example, the control header may be structured similar to the control parameters and may have a specific value (such as a series of binary ones) for the Control ID. The specific value indicates that the control header is a type of control parameter that contains the length of the A-Control field. The control header may be included as the first control parameter of the A-Control field to indicate the length of the A-Control field. Alternatively, the control header may be located at any location within the A-Control field and can indicate either the length of the full A-Control field or of the remaining portion (following the control header) of the A-Control field. Thus, the A-Control field may be variable-length to support signaling multiple types of control information. For example, the length of the A-Control field may vary between 4 bytes (baseline) and 64 bytes (maximum). The length of the A-Control field may be indicated by a length value and the length value may represent groups of octets (such as 1, 2, or 4 octets for each integer length value).

In some implementations, the specific control ID may be all ones (in which case, assuming the control ID is 4 bits long, the all ones binary value would have a decimal value of 15. Although the all ones example is used in this disclosure, the specific value may be any value that is supported by the recipient and that is not used as a control ID for other purposes. Following the specific control ID, the control information in the control header may indicate the length value as either a zero-length value, a non-zero value, or an all-ones length value. For example, a control parameter referred to as "ONES-NZL" (all ones for Control ID followed by a non-zero length value less than a maximum) may indicate that the A-Control field is a variable-length A-Control field having a length indicated by the non-zero length value. In some implementations, a control parameter referred to as a "ONES-EOF" (all ones for Control ID followed by all ones for the value) may indicate an end of the A-Control field. A control parameter referred to as "ONES-ZL" (all ones for Control ID followed by a zero-length value) may be used as a delimiter between different subsets of the control parameters included in the A-Control field.

For example, the most significant bit (MSB) of the traffic indicator (TID) field of the QoS Control field are currently reserved and set to 0. In some implementations, the setting of the MSB of the TID field to 1 may be used to indicate that the control information being provided by the A-Control field that follows in the same MPDU is relative to the auxiliary link (different from the anchor link on which the MPDU is being sent). The anchor link is the link where the frame is being sent, and auxiliary link is the link where the frame is not being sent. Using just one bit (such as the MSB of the TID field), the transmitting device may distinguish up to two links. The transmitting device may include MPDUs with different values of the MSB bit of the TID of the QoS Control if it wants to signal different control information for the two different links. For example, a first MPDU (with the MSB of the TID set to 0) may include an A-Control field with aggregated control information for the anchor link. A second MPDU (with the MSB of the TID set to 1) may include an A-Control field with control information for the auxiliary link.

In some implementations, the ONES-NZL may be the first control parameter in the A-Control field and may indicate an overall length of the Dynamic A-Control (with control parameters for multiple links). After a first subset of control parameters (such as for the anchor link), a delimiter may indicate whether control parameters for one or more auxiliary links is included. If no control information is available for a link, then a ONES-ZL may be used. Alternatively, the ONES-ZL may precede the control information for each of the auxiliary links. In some implementations, a ONES-EOF or Padding can be used to populate a remaining portion of the Dynamic A-Control field.

FIG. 8 also shows an A-Control field 862 as a series of control parameters (Control 1, Control 2, etc.). Each control parameter (such as a first control parameter 872) may be identified by a control identifier (ID) 874 that serves as a header the control parameter in a sequence of control parameters. Following the Control ID 874, the control information 878 may have a different length depending on the control ID 874 value.

In legacy systems, the length of the A-Control field was limited to 30 bits. The container (such as the HT Control field) of the A-Control field may have a total length of 32 bits, which includes 2 leading indicators, and 30 bits for control parameters. However, the limited size of the A-Control field constrains the quantity of control parameters that may be included. For example, the A-Control field may have been constrained to one or two control parameters depending on which control parameters were included.

In accordance with this disclosure, the A-Control field may have a longer length and may be variable in size to accommodate more control parameters. In the descriptions below, the length of the A-Control field may be described in a control header of the A-Control field. The control header may indicate a length of the container (such as the HT- Control field) of the A-Control field, or of the A-Control field itself. Because the length of the A-Control field and the HT-Control field are related, in this disclosure, references to the length of the A-Control field may be used interchangeably with reference to the length of the container (such as the HT-Control field) carrying the A-Control field. To indicate the length of the A-Control field, one of the control parameters may be repurposed to include the length value as control information. For example, a specific value for the control ID that is currently reserved, at least in part, may be used to indicate the length of the A-control field or to provide delimiters for multiple control parameters. In the implementations below, we describe the case where the Control ID value is equal to 15. Although the examples in this disclosure use the ONES value (control ID 15), it is also possible to use one of the reserved values (control ID 7 to 14) to indicate the length of the A-Control Field or the presence of another field following the Control ID field that indicates the length of the A-Control field. In some implementations, the length may indicate the length of the remaining portion of the A-Control field, or of a sub-portion of the A-Control field as described in more detail in some of the examples below.

Figure 9A:
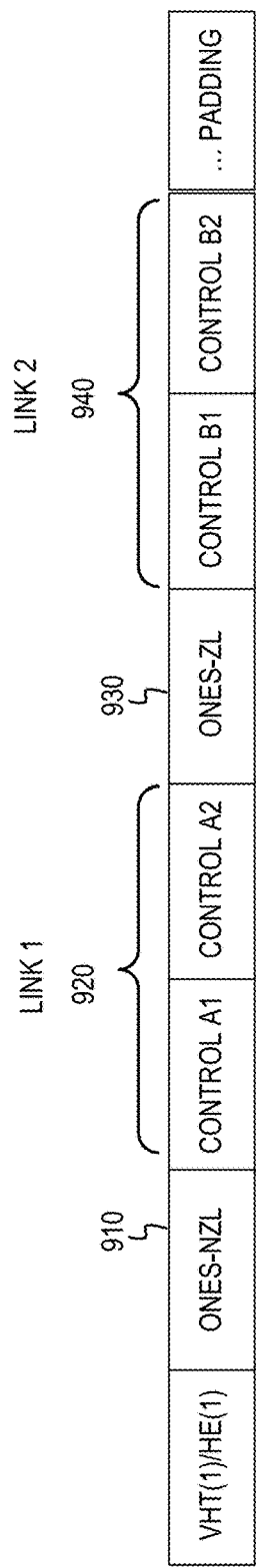
FIG. 9A shows a first example of an A-Control field that includes control parameters for one or more links of a multi-link association.
Figure 9B:
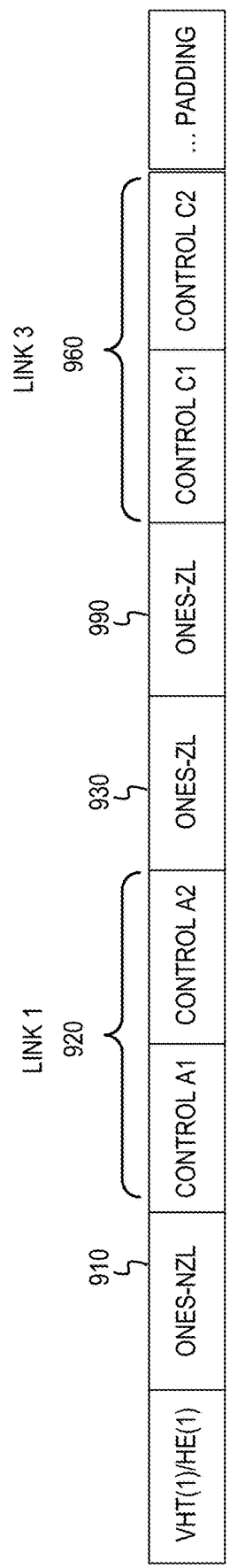
FIG. 9B shows another example of an A-Control field that includes control parameters for one or more links of a multi-link association.

FIGS. 9A and 9B show various options of an A-Control field that includes control parameters for one or more links of a multi-link association. In FIG. 9A, each link has separate control parameters. A first portion of the A-Control field is the ONES-NZL 910 that indicates the overall length of the A-Control field. The ONES-NZL 910 field may be followed by control parameters 920 for a first link 1 (such as control parameters A1 and A2). Then delimiters (the ONES-ZL field 930) may signal that the control parameters for the first link are complete and the next control parameters are for the next link 2. The control parameters 940 for link 2 (control parameters B1 and B2) may follow the ONES-ZL field 930).

As shown in FIG. 9B, if one of the links (such as link 2) does not have control parameters that need to be sent, the ONES-ZL field 930 may be followed by another ONES-ZL field 990 to begin the next link (link 3) section of control parameters 960 (with control parameters C1 and C2).

FIG. 9C shows an example of explicit indicators for multi-link aggregated control parameters. For example, each control parameter may have an explicit indicator (such as a link identifier, Link ID 979) included in a control parameter 970. The Link ID 979 may be included between the control ID 974 and the control information 978. In some implementations, the Link ID 979 may be included in the control IDs that are used as delimiters (such as the ONES-NZL and ONES-ZL examples in this disclosure).

FIG. 9D shows another example of an A-Control field with control parameters for one or more links of a multi-link association. In FIG. 9D, each link has separate control parameters. A first portion of the A-Control field is the ONES-NZL 910 that indicates the overall length of the A-Control field. The ONES-NZL 910 field may be followed by control parameters 920 for a first link 1 (such as control parameters A1 and A2). Then another delimiter (the ONES-NZL field 931) may signal that the control parameters for the first link are complete and the next control parameters are for the next link 2. The control parameters 940 for link 2 (control parameters B1 and B2) may follow the ONES-NZL field 931). A ONES-EOF field 980 may be used to signal the end of the A-Control field that has control parameters for multiple links. For example, the ONES-EOF may include an all-ONES (control ID=15) followed by an all-ones length value.

FIG. 9E shows an example of an A-Control field with control parameters for multiple links without using delimiters. For example, if each control parameters include an explicit link ID (as shown in FIG. 6), then the delimiters may be omitted. Alternatively, the order and occurrence of control parameters may implicitly indicate that they are for different links. For example, an A-Control field for a single link would not include more than one control parameter with the same Control ID. Therefore, if the same control ID is present in the A-Control field, the second occurrence of the control ID may implicitly signal the change to the next link. Using the example in FIG. 9E, a first set of control parameters 920 is related to a first link 1 and a second set of control parameters 940 may be related to a second link 2. The control parameter A1 may have the same control ID as the control parameter B1. When the recipient processes the A-Control field and detects control parameter B1 having the same control ID as control parameter A1, the recipient may determine that the control parameter B1 may be related to the second link.

As described herein, there may be various ways to include control parameters for multiple links. These techniques, or variations thereof, may be useful to activate and deactivate one or more links of a multi-link association. For example, an OM control parameter may set particular bits (such as the UL MU Disable or the UL MU Data Disable bits) to a first value (such as 1) to indicate deactivation of that link. In some implementations, a new control ID (such as one of the reserved values) may be defined to contain information related to link deactivation. For example, the control parameter may include a target switch time of the state (activated or deactivated) change. In some implementations, the activation and deactivation may be used to force a recipient to move from a first link to a second link. For example, a first link may be indicated to be deactivation at a target switch time while a second link may be indicated to be activation at the target switch time.

In some implementations, the time value may be relative based on a start or end time of the frame that carries the control parameters. For example, the time value may be a time offset relative to the frame. In some implementations, the timing information may include a timestamp or other time that is based on a synchronized time. A timing synchronization function (TSF) timer may be maintained in both the sending device and the receiving device. The timing information for a link activation or link deactivation may be a full or partial timestamp based on the TSF timer. In some implementations, the sending device and receiving device may maintain separate TSF timers for the first link and the second link. The timing information for activation or deactivation may be specific to the TSF timer for a particular link.

Figure 10:
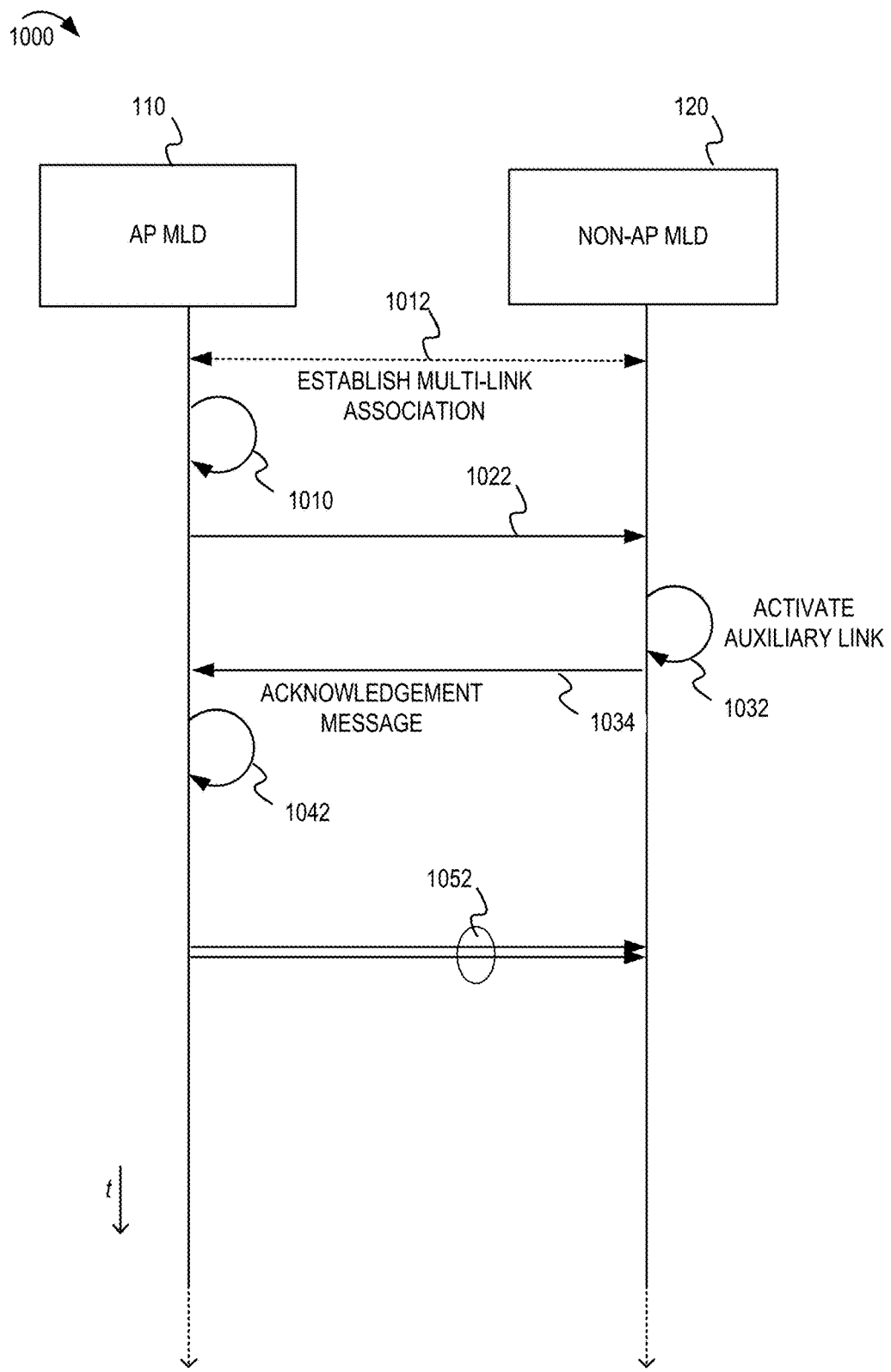
FIG. 10 depicts an example message flow diagram associated with multi-link communication.

FIG. 10 depicts an example message flow diagram associated with multi-link communication. The example message flow 1000 shows an AP MLD 110 and a non-AP MLD 120. The AP MLD 110 and the non-AP MLD 120 may establish a multi-link association at 1012. For example, the AP MLD 110 and the non-AP MLD 120 may exchange configuration messages to verify they both support the multi-link communication features (such as multi-link association and signaling) of this disclosure. The multi-link association may include an anchor link and at least one auxiliary link that are both configured during the multi-link association establishment process.

At process 1010, the AP MLD 110 may determine to activate or deactivate the auxiliary link. The first frame 1022 may include signaling regarding activation or deactivation of the auxiliary link. In the example of FIG. 10, the first frame 1022 includes an indicator to signal activation of the auxiliary link. At 1032, the non-AP MLD 120 may activate the auxiliary link. In some implementations, the non-AP MLD 120 may send an acknowledgment message to indicate that the auxiliary link has been activated. In some implementations, the acknowledgment message 1034 may include an indicator that indicates whether the non-AP MLD 120 properly processed the first frame 1022. At process 1042, the AP MLD 110 may process the acknowledgment message 1034 and determine whether the auxiliary link has been activated. At 1052, the AP MLD 110 may communicate with the non-AP MLD 120 via the anchor link and the auxiliary link concurrently.

Figure 11:
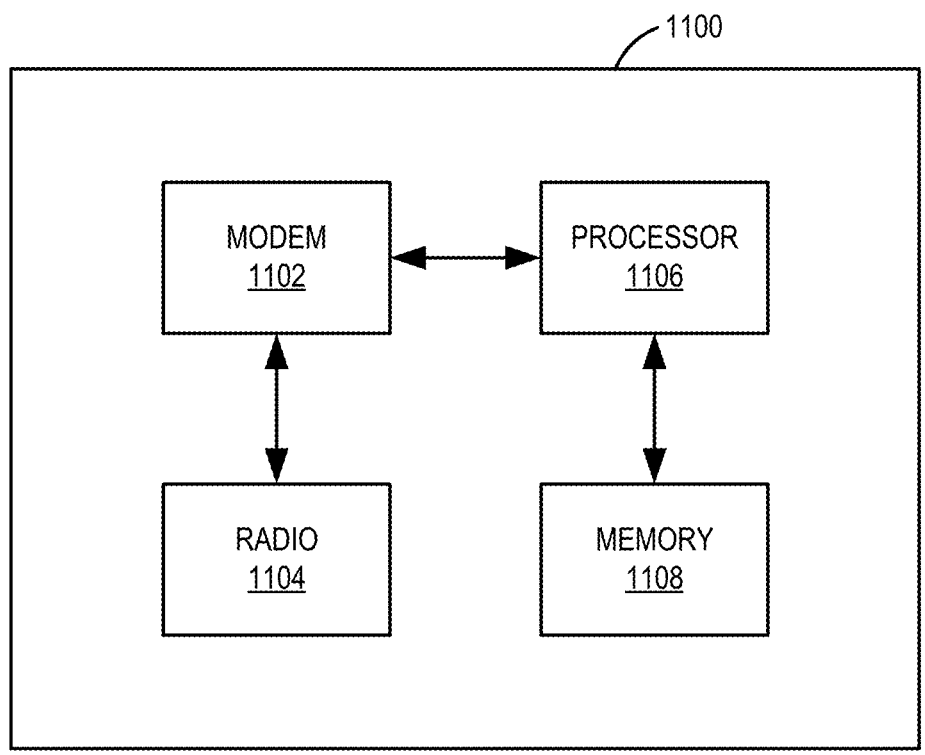
FIG. 11 shows a block diagram of an example wireless communication device.

FIG. 11 shows a block diagram of an example wireless communication device 1100. The wireless communication device 1100 can be an example of an AP MLD 110 or a non-AP MLD 120, such as those described herein. In some implementations, the wireless communication device 1100 can be an example of a device for use in a STA such as one of the STAs 104, 144 described herein. In some implementations, the wireless communication device 1100 can be an example of a device for use in an AP such as the AP 102 described herein. The wireless communication device 1100 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and Media Access Control (MAC) protocol data units (MPDUs) conforming to an IEEE 802.11 standard, such as that defined by the IEEE 802.11-2016 specification or amendments thereof including, but not limited to, 802.11ah, 802.11ad, 802.1 lay, 802.11ax, 802.11az, 802.11ba, 802.11be and further such amendments.

The wireless communication device 1100 can be, or can include, a chip, system on chip (SoC), chipset, package or device that includes one or more modems 1102, for example, a Wi-Fi (IEEE 802.11 compliant) modem. In some implementations, the one or more modems 1102 (collectively "the modem 1102") additionally include a WWAN modem (for example, a 3GPP 4G LTE or 5G compliant modem). In some implementations, the wireless communication device 1100 also includes one or more radios (collectively "the radio 1104"). In some implementations, the wireless communication device 1100 further includes one or more processors, processing blocks or processing elements (collectively "the processor 1106") and one or more memory blocks or elements (collectively "the memory 1108").

The modem 1102 can include an intelligent hardware block or device such as, for example, an application-specific integrated circuit (ASIC) among other possibilities. The modem 1102 is generally configured to implement a PHY layer. For example, the modem 1102 is configured to modulate packets and to output the modulated packets to the radio 1104 for transmission over the wireless medium. The modem 1102 is similarly configured to obtain modulated packets received by the radio 1104 and to demodulate the packets to provide demodulated packets. In addition to a modulator and a demodulator, the modem 1102 may further include digital signal processing (DSP) circuitry, automatic gain control (AGC), a coder, a decoder, a multiplexer and a demultiplexer. For example, while in a transmission mode, data obtained from the processor 1106 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1104. In implementations involving beamforming, the modulated symbols in the respective spatial streams are precoded via a steering matrix prior to their provision to the IFFT block.

While in a reception mode, digital signals received from the radio 1104 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 1106) for processing, evaluation or interpretation.

The radio 1104 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 1100 can include, or be coupled with, multiple transmit antennas (each with a corresponding transmit chain) and multiple receive antennas (each with a corresponding receive chain). The symbols output from the modem 1102 are provided to the radio 1104, which transmits the symbols via the coupled antennas. Similarly, symbols received via the antennas are obtained by the radio 1104, which provides the symbols to the modem 1102.

The processor 1106 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1106 processes information received through the radio 1104 and the modem 1102, and processes information to be output through the modem 1102 and the radio 1104 for transmission through the wireless medium. For example, the processor 1106 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1106 may generally control the modem 1102 to cause the modem to perform various operations described above.

The memory 1108 can include tangible storage media such as random-access memory (RAM) or read-only memory (ROM), or combinations thereof. The memory 1108 also can store non-transitory processor- or computer-executable software (SW) code containing instructions that, when executed by the processor 1106, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the wireless communication device 1100 may include a multi-link communication control unit (not shown). The multi-link communication control unit may be similar to the multi-link communication control unit 112 or the multi-link communication control unit 122 described with reference to FIG. 2B and may implement any of the techniques described herein. In some implementations, the multi-link communication control unit may be implemented by a processor 1106 and a memory 1108. The memory 1108 can include computer instructions executable by the processor 1106 to implement the functionality of multi-link communication control unit. Any of these functionalities may be partially (or entirely) implemented in hardware or on the processor 1106.

Figure 12B:
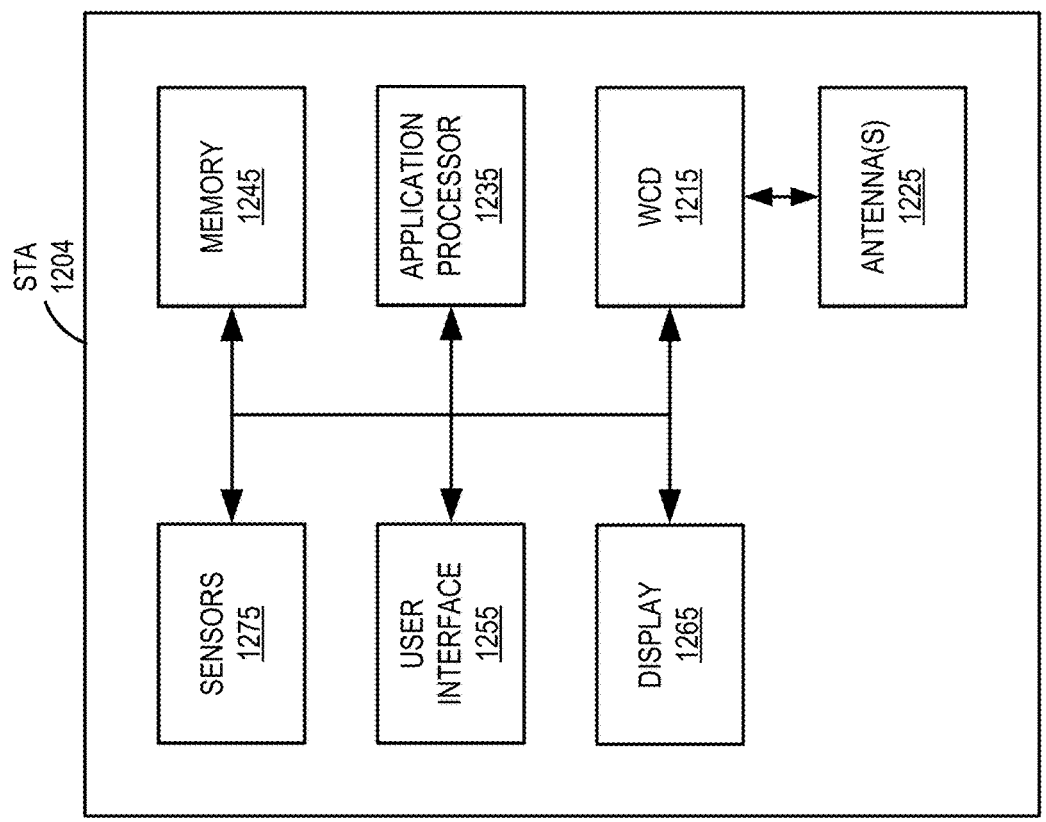
FIG. 12B shows a block diagram of an example STA.
Figure 12A:
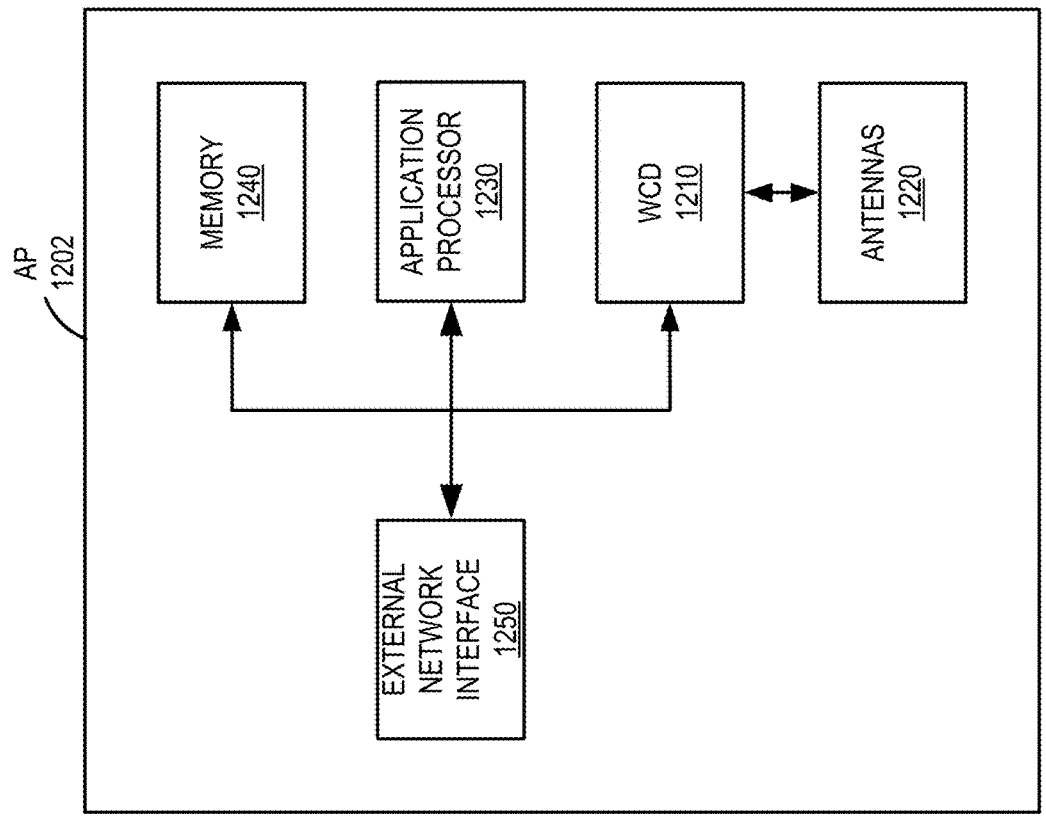
FIG. 12A shows a block diagram of an example AP.

FIG. 12A shows a block diagram of an example AP 1202. The AP 1202 can be an example of an AP MLD 110, such as those described herein. The AP 1202 can be an example implementation of the AP 102 described herein. The AP 1202 includes a wireless communication device (WCD) 1210. For example, the wireless communication device 1210 may be an example implementation of the wireless communication device 1100 described with reference to FIG. 11. The AP 1202 also includes multiple antennas 1220 coupled with the wireless communication device 1210 to transmit and receive wireless communications. In some implementations, the AP 1202 additionally includes an application processor 1230 coupled with the wireless communication device 1210, and a memory 1240 coupled with the application processor 1230. The AP 1202 further includes at least one external network interface 1250 that enables the AP 1202 to communicate with a core network or backhaul network to gain access to external networks including the Internet. For example, the external network interface 1250 may include one or both of a wired (for example, Ethernet) network interface and a wireless network interface (such as a WWAN interface). Ones of the aforementioned components can communicate with other ones of the components directly or indirectly, over at least one bus. The AP 1202 further includes a housing that encompasses the wireless communication device 1210, the application processor 1230, the memory 1240, and at least portions of the antennas 1220 and external network interface 1250.

FIG. 12B shows a block diagram of an example STA 1204. The STA 1204 can be an example of a non-AP MLD 120, such as those described herein. The STA 1204 can be an example implementation of the STA 104, 144 described herein. The STA 1204 includes a wireless communication device 1215. For example, the wireless communication device 1215 may be an example implementation of the wireless communication device 1100 described with reference to FIG. 11. The STA 1204 also includes one or more antennas 1225 coupled with the wireless communication device 1215 to transmit and receive wireless communications. The STA 1204 additionally includes an application processor 1235 coupled with the wireless communication device 1215, and a memory 1245 coupled with the application processor 1235. In some implementations, the STA 1204 further includes a user interface (UI) 1255 (such as a touchscreen or keypad) and a display 1265, which may be integrated with the UI 1255 to form a touchscreen display. In some implementations, the STA 1204 may further include one or more sensors 1275 such as, for example, one or more inertial sensors, accelerometers, temperature sensors, pressure sensors, or altitude sensors. Ones of the aforementioned components can communicate with other ones of the components directly or indirectly, over at least one bus. The STA 1204 further includes a housing that encompasses the wireless communication device 1215, the application processor 1235, the memory 1245, and at least portions of the antennas 1225, UI 1255, and display 1265.

Figure 13:
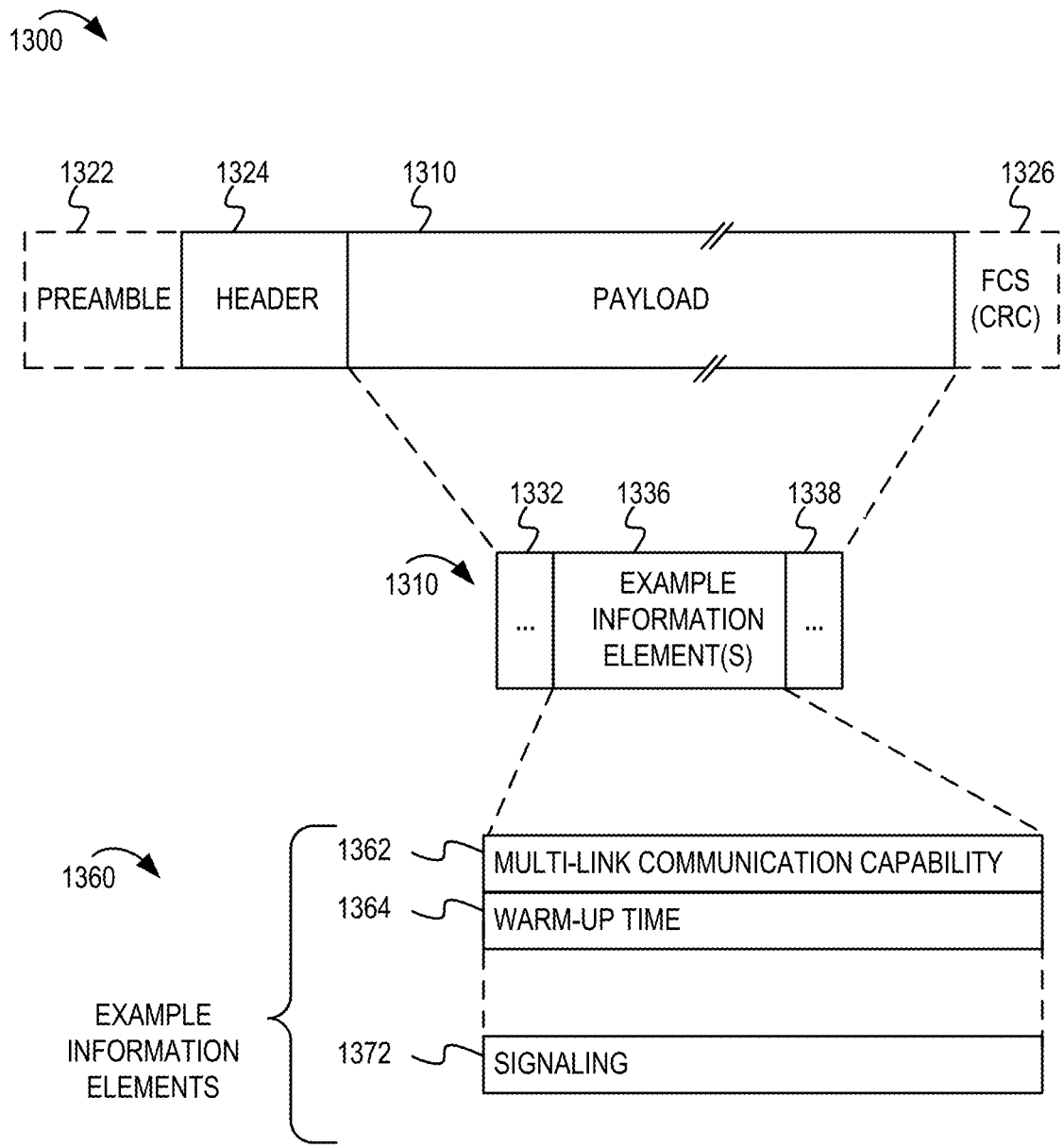
FIG. 13 depicts a conceptual diagram of an example frame for multi-link communication.

FIG. 13 depicts a conceptual diagram of an example frame for multi-link communication. For example, the example frame 1300 may be sent from an AP to a wireless device or from a wireless device to an AP. In some implementations, the example frame 1300 may include or be included in a configuration message. The example frame 1300 may be defined by the IEEE 802.11 specification. In some other implementations, the example frame 1300 may be a new frame format created to facilitate multi-link communication. One example of the example frame 1300 may include an enhanced beacon frame that may be used by IEEE 802.11 (similar to the beacon frames defined for IEEE 802.11ax). Another example of an example frame 1300 may be a synchronization frame or other short frame that may be defined for other technologies (or next generation of IEEE 802.11, beyond 802.11ax).

The example frame 1300 may include a header 1324 and a payload 1310. In some implementations, the header 1324 may include source addresses (such as the network address of the sending AP), the length of data frame, or other frame control information. The payload 1310 may be used to convey the multi-link communication capability or configuration information. The multi-link communication capability or configuration information may be organized or formatted in a variety of ways.

In some implementations, the example frame 1300 may include a preamble 1322. The preamble 1322 may be used, for example, when the transmission is non-triggered or non-scheduled. In some implementations, the preamble may be omitted for triggered or scheduled transmissions. When the preamble is present, the preamble 1322 may include one or more bits to establish synchronization. The example management frame 1300 may include an optional frame check sequence (FSC) 1326. The payload 1310 may be organized with a message format and may include information elements 1332, 1336, and 1338.

Several examples of information elements 1360 are illustrated in FIG. 13. The information elements 1360 may include multi-link communication capability information 1362, a warm up time period 1364, or signaling 1372.

Figure 14:
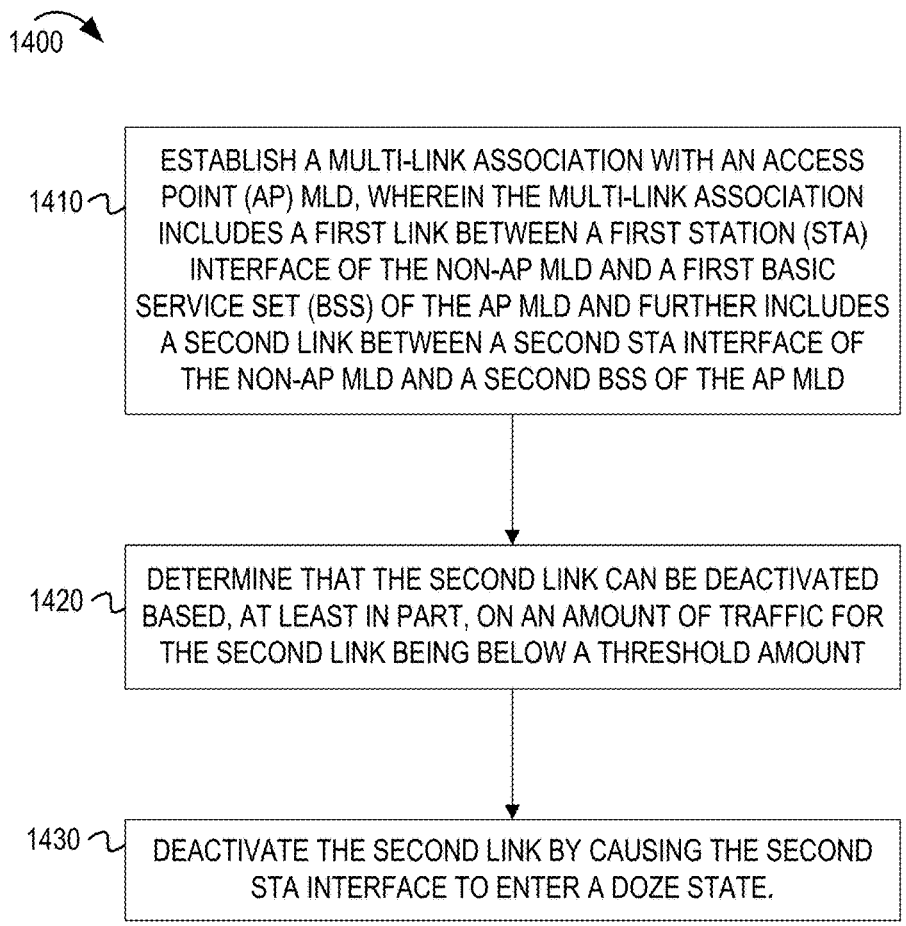
FIG. 14 shows a flowchart illustrating an example process for connecting to services.

FIG. 14 shows a flowchart illustrating an example process 1400 for connecting to services. In some implementations, the process 1400 may be performed by a wireless communication device such as an AP MLD or non-AP MLD.

In block 1410, the non-AP MLD may establish a multi-link association with an AP MLD. The multi-link association may include a first link between a first STA interface of the non-AP MLD and a first BSS of the AP MLD and may further include a second link between a second STA interface of the non-AP MLD and a second BSS of the AP MLD.

In block 1420, the non-AP MLD may determine that the second link can be deactivated based, at least in part, on an amount of traffic for the second link being below a threshold amount.

In block 1430, the non-AP MLD may deactivate the second link by causing the second STA interface to enter a doze state.

Figure 15:
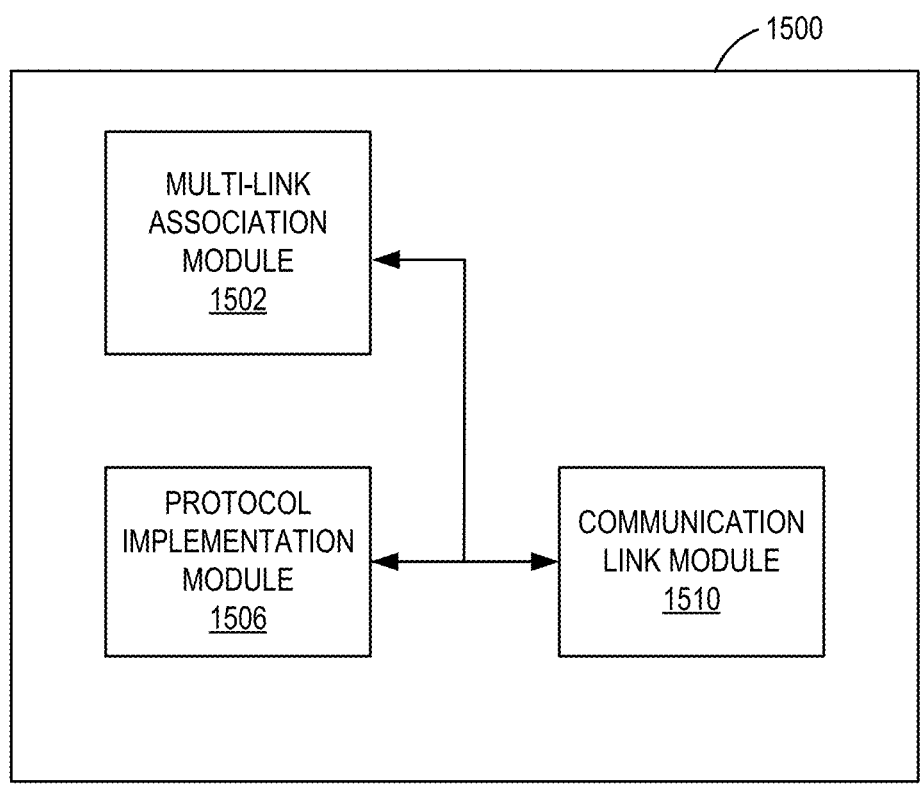
FIG. 15 shows a block diagram of an example wireless communication device for use in wireless communication.

FIG. 15 shows a block diagram of an example wireless communication device 1500 for use in wireless communication. In some implementations, the wireless communication device 1500 can be an example of an AP MLD 110 or a non-AP MLD 120, such as those described herein. In some implementations, the wireless communication device 1500 can be an example of the STA 104, 144, 1204 or the wireless communication devices 1100, 1215 described herein. In some implementations, the wireless communication device 1500 can be an example of the AP 102, 1202 or wireless communication devices 1100, 1210. In some implementations, the wireless communication device 1500 is configured to perform one or more of the processes described herein. The wireless communication device 1500 includes a multi-link association module 1502, a protocol implementation module 1506, and a communication link module 1510. Portions of one or more of the modules 1502, 1506 and 1510 may be implemented at least in part in hardware or firmware. In some implementations, at least some of the modules 1502, 1506 and 1510 are implemented at least in part as software stored in a memory (such as the memory 1108, 1240, or 1245). For example, portions of one or more of the modules 1502, 1506 and 1510 can be implemented as non-transitory instructions (or "code") executable by at least one processor (such as the processor 1106) to perform the functions or operations of the respective module.

The multi-link association module 1502 may manage the establish a multi-link association with another MLD. For example, the multi-link association module 1502 may establish a multi-link association with an AP MLD. The protocol implementation module 1506 may implement a multi-link association protocol between the wireless device the other MLD. For example, the protocol implementation module 1506 may be configured to interpret any of the signaling described herein. The communication link module 1510 may manage the activation or deactivation of auxiliary links of a multi-link association.

FIGS. 1-15 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communications at a first wireless communication device, comprising:
   one or more processors; and
   one or more memories coupled with the one or more processors and that store processor-executable code that, when executed by the one or more processors, is configured to cause the apparatus to:
      establish a multi-link association between the first wireless communication device and a second wireless communication device, wherein the multi-link association includes a first link between the first wireless communication device and the second wireless communication device and further includes a second link between the first wireless communication device and the second wireless communication device;
      output, to the second wireless communication device, a first frame including multi-link control information indicative of which one or more links of the first link and the second link are associated with a state change; and
      obtain, from the second wireless communication device, a second frame indicative that the second wireless communication device has changed a state of one or both of the first link and the second link in accordance with the multi-link control information.

2. The apparatus of claim 1, wherein the multi-link control information is indicative of which of the first link and the second link are to be activated in accordance with which of the first link or the second link have data traffic.

3. The apparatus of claim 1, wherein the first frame is a management frame, and wherein the processor-executable code, when executed by the one or more processors, is configured to cause the apparatus to:
   communicate multi-link capability parameters between the first wireless communication device and the second wireless communication device, wherein the multi-link capability parameters include at least a first value indicating a warm up time associated with a time to change the state of the second link.

4. The apparatus of claim 1, wherein the second frame includes an indication of the one or more links of the first link and the second link that are associated with the state change.

5. The apparatus of claim 1, wherein the multi-link control information is included in an aggregated control (A-Control) field of a header of the first frame, and wherein the second frame is an acknowledgement via the first link or the second link.

6. The apparatus of claim 1, wherein the first wireless communication device is an access point (AP) entity including a first AP and a second AP and the second wireless communication device is a non-AP entity including a first station (STA) and a second STA, and wherein the first link is between the first AP of the AP entity and the first STA of the non-AP entity and the second link is between the second AP of the AP entity and the second STA of the non-AP entity.

7. The apparatus of claim 6, wherein the multi-link control information includes one or more traffic identifiers (TIDs) mapped to respective ones of the first link and the second link, wherein:
   the processor-executable code, when executed by the one or more processors, is configured to cause the apparatus to:
      delay data traffic associated with a traffic identifier (TID) mapped to the second link when the second STA is not activated; and
      output the first frame via the first link to indicate that the second link is to be activated in accordance with the data traffic being mapped to the second link when the second STA is not activated.

8. The apparatus of claim 1, wherein the multi-link control information is indicative of which of the first link and the second link are to be activated in accordance with an amount of data to be sent to the second wireless communication device.

9. The apparatus of claim 1, wherein, to establish the multi-link association, the processor-executable code, when executed by the one or more processors, is further configured to cause the apparatus to:
   output, via the first link, a configuration regarding the second link, the configuration indicating one or more parameters selected from a group consisting of quality of service, bandwidth, wireless channel, transmission rate, and frequency band.

10. The apparatus of claim 1, wherein, to establish the multi-link association, the processor-executable code, when executed by the one or more processors, is further configured to cause the apparatus to:
   output frames to the second wireless communication device via either the first link or the second link based on which of the first link and the second link are activated.

11. The apparatus of claim 1, wherein the second frame is a frame format selected from a group consisting of a management frame, a control frame, a data frame, a request to send (RTS), a clear to send (CTS), an acknowledgement, a power saving poll (PS-POLL) frame, a quality-of service (QOS) Null frame, and a null data packet (NDP).

12. The apparatus of claim 1, wherein the state change is associated with at least one of enablement of the one or both of the first link and the second link, a disablement of the one or both of the first link and the second link, an unavailability of the one or both of the first link and the second link, a doze state of the one or both of the first link and the second link, or an awake state of the one or both of the first link and the second link.

13. The apparatus of claim 1, wherein the first frame is a beacon frame.

14. An apparatus for wireless communications at a first wireless communication device, comprising:
  one or more processors; and
  one or more memories coupled with the one or more processors and that store processor-executable code that, when executed by the one or more processors, is configured to cause the apparatus to:
    establish a multi-link association between the first wireless communication device and a second wireless communication device, wherein the multi-link association includes a first link between the first wireless communication device and the second wireless communication device and further includes a second link between the first wireless communication device and the second wireless communication device;
    obtain, from the second wireless communication device, a first frame including multi-link control information indicative of which one or more links of the first link and the second link are associated with a state change; and
    output, to the second wireless communication device, a second frame indicative that the first wireless communication device has changed a state of one or both of the first link and the second link in accordance with the multi-link control information.

15. The apparatus of claim 14, wherein the multi-link control information is indicative of which links of the first link and the second link are to be activated in accordance with which of the first link or the second link have data traffic.

16. The apparatus of claim 14, wherein the first link is maintained as a primary link for receiving the multi-link control information for the multi-link association, and wherein the one or more links are dynamically activated using the first frame.

17. The apparatus of claim 14, wherein the first wireless communication device is a non-access point (AP) entity including a first station (STA) and a second STA and the second wireless communication device is an AP entity including a first AP and a second AP, wherein the first link is between the first AP of the AP entity and the first STA of the non-AP entity and the second link is between the second AP of the AP entity and the second STA of the non-AP entity, wherein the multi-link control information is indicative of the second link having data traffic, and wherein the processor-executable code, when executed by the one or more processors, is configured to cause the apparatus to:
  activate the second STA to receive the data traffic for the second link.

18. The apparatus of claim 14, wherein the first wireless communication device is a non-access point (AP) entity including a first station (STA) and a second STA and the second wireless communication device is an AP entity including a first AP and a second AP, wherein the first link is between the first AP of the AP entity and the first STA of the non-AP entity and the second link is between the second AP of the AP entity and the second STA of the non-AP entity, wherein the multi-link control information includes signaling associated with activating the second link, wherein the processor-executable code, when executed by the one or more processors, is configured to cause the apparatus to:
  deactivate the first STA;
  switch from a first connection associated with the first STA to a second connection associated with the second STA; and
  activate the second STA.

19. The apparatus of claim 14, wherein the state change is associated with at least one of enablement of the one or both of the first link and the second link, a disablement of the one or both of the first link and the second link, an unavailability of the one or both of the first link and the second link, a doze state of the one or both of the first link and the second link, or an awake state of the one or both of the first link and the second link.

20. The apparatus of claim 14, wherein the first frame is a beacon frame.

21. A method for wireless communication by a first wireless communication device, comprising:
  establishing a multi-link association between the first wireless communication device and a second wireless communication device, wherein the multi-link association includes a first link between the first wireless communication device and the second wireless communication device and further includes a second link between the first wireless communication device and the second wireless communication device;
  transmitting, to the second wireless communication device, a first frame including multi-link control information indicative of which one or more links of the first link and the second link are associated with a state change; and
  receiving, from the second wireless communication device, a second frame indicative that the second wireless communication device has changed a state of one or both of the first link and the second link in accordance with the multi-link control information.

22. The method of claim 21, wherein transmitting the first frame comprises:
  transmitting the first frame via the first link.

23. The method of claim 22, wherein the first link is maintained as a primary link for signaling the multi-link control information for the multi-link association.

24. The method of claim 21, wherein the multi-link control information is indicative of which of the first link and the second link are to be activated, and wherein the one or both of the first link and the second link are dynamically activated using the first frame.

25. The method of claim 21, wherein the first frame is a beacon frame.

26. The method of claim 21, wherein the second frame is indicative that the second wireless communication device has activated one or more links in accordance with the multi-link control information.

27. The method of claim 21, wherein the multi-link control information is indicative of which of the first link and the second link have buffered traffic.

28. A method for wireless communication by a first wireless communication device, comprising:
  establishing a multi-link association between the first wireless communication device and a second wireless communication device, wherein the multi-link association includes a first link between the first wireless communication device and the second wireless communication device and further includes a second link between the first wireless communication device and the second wireless communication device;

receiving, from the second wireless communication device, a first frame including multi-link control information indicative of which one or more links of the first link and the second link are associated with a state change; and transmitting, to the second wireless communication device, a second frame indicative that the first wireless communication device has changed a state of one or both of the first link and the second link in accordance with the multi-link control information.

29. The method of claim 28, wherein receiving the first frame comprises:

receiving the first frame via the first link.

30. The method of claim 28, wherein the first frame is a beacon frame.

31. The method of claim 28, wherein the second frame is indicative that the first wireless communication device has activated one or more links in accordance with the multi-link control information.

32. The method of claim 28, wherein the multi-link control information is indicative of which of the first link and the second link have buffered traffic.

* * * * *